US009939803B2

(12) United States Patent
Regan

(10) Patent No.: US 9,939,803 B2
(45) Date of Patent: *Apr. 10, 2018

(54) AUTOMATED MANUFACTURING OF SHOE PARTS

(71) Applicant: Nike, Inc., Beaverton, OR (US)

(72) Inventor: Patrick Conall Regan, Taichung (TW)

(73) Assignee: NIKE, Inc., Beaverton, OR (US)

( * ) Notice: Subject to any disclaimer, the term of this patent is extended or adjusted under 35 U.S.C. 154(b) by 279 days.

This patent is subject to a terminal disclaimer.

(21) Appl. No.: 14/586,575

(22) Filed: Dec. 30, 2014

(65) Prior Publication Data
US 2015/0261202 A1 Sep. 17, 2015

Related U.S. Application Data

(63) Continuation of application No. 13/299,819, filed on Nov. 18, 2011, now Pat. No. 8,958,901.

(51) Int. Cl.
| *G06F 19/00* | (2011.01) |
| *G05B 19/402* | (2006.01) |
| *A43D 11/00* | (2006.01) |
| *A43D 63/00* | (2006.01) |

(52) U.S. Cl.
CPC ............ *G05B 19/402* (2013.01); *A43D 11/00* (2013.01); *A43D 63/00* (2013.01); *A43D 2200/10* (2013.01); *A43D 2200/30* (2013.01); *A43D 2200/60* (2013.01); *G05B 2219/37077* (2013.01)

(58) Field of Classification Search
CPC combination set(s) only.
See application file for complete search history.

(56) References Cited

U.S. PATENT DOCUMENTS

| 4,639,963 A | 2/1987 | Fisher |
| 4,671,755 A | 6/1987 | Graae et al. |
| 4,866,802 A | 9/1989 | Stein |
| 4,996,012 A | 2/1991 | Gierschewski et al. |
| 5,027,281 A | 6/1991 | Rekow et al. |
| 5,105,564 A | 4/1992 | Motoda |

(Continued)

FOREIGN PATENT DOCUMENTS

| CA | 2791913 A1 | 9/2011 |
| CN | 85108140 A | 4/1986 |

(Continued)

OTHER PUBLICATIONS

European Extended Search Report dated Sep. 18, 2015 in Application No. 12850224.2, 9 pages.

(Continued)

*Primary Examiner* — Kidest Bahta
(74) *Attorney, Agent, or Firm* — Shook, Hardy & Bacon L.L.P.

(57) ABSTRACT

Manufacturing of a shoe or a portion of a shoe is enhanced by executing various shoe-manufacturing processes in an automated fashion. For example, information describing a shoe part may be determined, such as an identification, an orientation, a color, a surface topography, an alignment, a size, etc. Based on the information describing the shoe part, automated shoe-manufacturing apparatuses may be instructed to apply various shoe-manufacturing processes to the shoe part.

20 Claims, 8 Drawing Sheets

(56) References Cited

U.S. PATENT DOCUMENTS

| | | |
|---|---|---|
| 5,218,427 A | 6/1993 | Koch |
| 5,231,470 A | 7/1993 | Koch |
| 5,255,352 A | 10/1993 | Falk et al. |
| 5,259,468 A | 11/1993 | Warren et al. |
| 5,377,011 A | 12/1994 | Koch |
| 5,506,682 A | 4/1996 | Pryor |
| 5,671,055 A | 9/1997 | Whittlesey et al. |
| 5,768,732 A | 6/1998 | Blanc |
| 5,784,737 A | 7/1998 | Tsuji |
| 5,807,449 A | 9/1998 | Hooker et al. |
| 5,819,016 A | 10/1998 | Watanabe et al. |
| 5,836,428 A | 11/1998 | Young |
| 5,920,395 A | 7/1999 | Schulz et al. |
| 6,009,359 A | 12/1999 | El et al. |
| 6,051,028 A | 4/2000 | McCartney et al. |
| 6,301,763 B1 | 10/2001 | Pryor |
| 6,438,780 B1 | 8/2002 | Hansen et al. |
| 6,473,667 B1 | 10/2002 | Lee |
| 6,533,885 B2 | 3/2003 | Davis et al. |
| 6,611,617 B1 | 8/2003 | Crampton |
| 6,721,444 B1 | 4/2004 | Gu et al. |
| 6,765,572 B2 | 7/2004 | Roelofs |
| 6,779,032 B1 * | 8/2004 | Hericourt ............... H04L 29/06 709/203 |
| 6,816,755 B2 | 11/2004 | Habibi et al. |
| 6,867,772 B2 | 3/2005 | Kotcheff et al. |
| 6,900,450 B2 * | 5/2005 | Gimenez ........... A61F 13/15756 250/559.29 |
| 6,952,204 B2 | 10/2005 | Baumberg et al. |
| 7,065,242 B2 | 6/2006 | Petrov et al. |
| 7,079,114 B1 | 7/2006 | Smith et al. |
| 7,204,043 B2 | 4/2007 | Kilgore |
| 7,446,733 B1 | 11/2008 | Hirimai |
| 7,620,235 B2 | 11/2009 | Daniel |
| 7,657,100 B2 | 2/2010 | Gokturk et al. |
| 7,881,896 B2 | 2/2011 | Atwell et al. |
| 8,035,052 B2 | 10/2011 | De La Ballina et al. |
| 8,107,721 B2 | 1/2012 | Beardsley et al. |
| 8,143,494 B2 | 3/2012 | Eby |
| 8,220,335 B2 | 7/2012 | Dubois et al. |
| 8,233,667 B2 | 7/2012 | Helgason et al. |
| 8,545,743 B2 | 10/2013 | Spanks et al. |
| 8,849,620 B2 | 9/2014 | Regan et al. |
| 8,966,775 B2 | 3/2015 | Regan et al. |
| 9,237,780 B2 | 1/2016 | Jurkovic et al. |
| 9,451,810 B2 | 9/2016 | Regan et al. |
| 9,668,545 B2 | 6/2017 | Jurkovic et al. |
| 2001/0010249 A1 | 8/2001 | McNichols |
| 2001/0042321 A1 | 11/2001 | Tawney et al. |
| 2002/0024677 A1 | 2/2002 | Metcalfe |
| 2003/0038253 A1 | 2/2003 | Raskar |
| 2003/0062110 A1 * | 4/2003 | Urlaub ..................... B06B 3/02 156/73.1 |
| 2003/0139848 A1 | 7/2003 | Cifra et al. |
| 2003/0231793 A1 | 12/2003 | Crampton |
| 2003/0231797 A1 | 12/2003 | Cullen et al. |
| 2004/0022426 A1 | 2/2004 | Carbone, II et al. |
| 2005/0135670 A1 | 6/2005 | Vaidyanathan |
| 2005/0154485 A1 | 7/2005 | Popp et al. |
| 2006/0041448 A1 | 2/2006 | Patterson et al. |
| 2006/0143839 A1 | 7/2006 | Fromme |
| 2006/0155417 A1 | 7/2006 | Cremaschi |
| 2006/0221072 A1 | 10/2006 | Se et al. |
| 2006/0266593 A1 | 11/2006 | Cerreto et al. |
| 2008/0139126 A1 | 6/2008 | Lee et al. |
| 2008/0147219 A1 | 6/2008 | Jones et al. |
| 2008/0189194 A1 | 8/2008 | Bentvelzen |
| 2010/0036753 A1 | 2/2010 | Harvill et al. |
| 2010/0149178 A1 | 6/2010 | Yokoyama et al. |
| 2010/0238271 A1 | 9/2010 | Pfeiffer et al. |
| 2010/0243030 A1 | 9/2010 | Yago |
| 2011/0000299 A1 | 1/2011 | Isobe et al. |
| 2011/0061265 A1 | 3/2011 | Lyden |
| 2011/0166694 A1 | 7/2011 | Griffits et al. |
| 2011/0172797 A1 | 7/2011 | Jones et al. |
| 2011/0232008 A1 | 9/2011 | Crisp |
| 2011/0292406 A1 | 12/2011 | Hollenbeck et al. |
| 2012/0287253 A1 | 11/2012 | Makover et al. |
| 2013/0030773 A1 | 1/2013 | O'Hare |
| 2013/0131865 A1 | 5/2013 | Yamane |
| 2013/0132038 A1 | 5/2013 | Regan et al. |
| 2014/0081441 A1 | 3/2014 | Regan et al. |
| 2014/0096403 A1 | 4/2014 | Regan et al. |
| 2015/0135447 A1 | 5/2015 | Jurkovic et al. |
| 2017/0105490 A1 | 4/2017 | Makover et al. |

FOREIGN PATENT DOCUMENTS

| | | |
|---|---|---|
| CN | 1293752 A | 5/2001 |
| CN | 1753611 A | 3/2006 |
| CN | 1831687 A | 9/2006 |
| CN | 2865565 Y | 2/2007 |
| CN | 102157013 A | 8/2011 |
| DE | 4020538 C1 | 8/1991 |
| DE | 10343620 A1 | 4/2005 |
| EP | 0123173 A2 | 3/1988 |
| EP | 0512773 A1 | 11/1992 |
| EP | 0572123 A2 | 12/1993 |
| EP | 0422946 B1 | 6/1996 |
| EP | 0840880 B1 | 3/2002 |
| EP | 1544800 A2 | 6/2005 |
| EP | 0790010 A1 | 4/2011 |
| FR | 2911255 A1 | 7/2008 |
| GB | 2140345 A | 11/1984 |
| JP | 2002217251 A | 8/2002 |
| JP | 2011143497 A | 7/2011 |
| TW | 201017092 A | 5/2010 |
| TW | 201128569 A | 8/2011 |
| WO | 9111885 A1 | 8/1991 |
| WO | 9727451 A1 | 7/1997 |
| WO | 99055186 A1 | 11/1999 |
| WO | 0036943 A1 | 6/2000 |
| WO | 2008044943 A1 | 4/2008 |
| WO | 2010034044 A2 | 4/2010 |

OTHER PUBLICATIONS

European Extended Search Report dated Oct. 13, 2015 in Application No. 12849307.9, 9 pages.

European Extended Search Report dated Oct. 27, 2015 in Application No. 12849978.7, 6 pages.

European Extended Search Report dated Nov. 13, 2015 in Application No. 12850527.8, 11 pages.

Final Office Action dated Dec. 17, 2015 in U.S. Appl. No. 13/299,856, 12 pages.

International Search Report with Written Opinion dated Jan. 30, 2015 in PCT Application No. PCT/US2014/059929, 92 pages.

European Extended Search Report dated Mar. 15, 2016 in Application No. 15003012.0, 9 pages.

European Extended Search Report dated Mar. 14, 2016 in Application No. 15002942.9, 8 pages.

International Search Report with Written Opinion dated Jan. 29, 2013 in Application No. PCT/US12/65516, 8 pages.

International Search Report with Written Opinion dated Feb. 5, 2013 in Application No. PCT/US12/65572, 10 pages.

International Search Report with Written Opinion dated Feb. 8, 2013 n Application No. PCT/US12/65542, 10 pages.

Notice of Allowance dated Feb. 3, 2014 in U.S. Appl. No. 13/299,872, 10 pages.

Non-Final Office Action dated Jan. 13, 2014 in U.S. Appl. No. 13/299,827, 21 pages.

Jin et al., Detection of 3D Curve for Shoe Sole Spraying Based on Laser Triangulation Measurement, Proc. IEEE Int. Conf. on Auto. And Log., Shenyang, China, Aug. 2009, 4 pages.

Non-Final Office Action dated Jun. 3, 2014 in U.S. Appl. No. 13/299,819, 21 pages.

Notice of Allowance dated Jun. 19, 2014 in U.S. Appl. No. 13/299,827, 7 pages.

Non-Final Office Action dated Jul. 7, 2014 in U.S. Appl. No. 13/299,856, 17 pages.

(56) References Cited

OTHER PUBLICATIONS

International Search Report with Written Opinion dated Feb. 5, 2013 in Application No. PCT/US2012/065537, 10 pages.
Notice of Allowance dated Oct. 2, 2014 in U.S. Appl. No. 13/299,819, 8 pages.
Final Office Action dated Dec. 4, 2014 in U.S. Appl. No. 13/299,856, 23 pages.
Non-Final Office Action dated Feb. 6, 2015 in U.S. Appl. No. 14/267,503, 10 pages.
Notice of Allowance dated Mar. 16, 2015 in U.S. Appl. No. 14/267,503, 6 pages.
Non-Final Office Action dated Jun. 17, 2015 in U.S. Appl. No. 13/299,856, 13 pages.
Partial European Search Report dated Jul. 24, 2015 in Application No. 12850527.8, 7 pages.
International Preliminary Report on Patentability dated Jun. 2, 2016 for PCT Application No. PCT/US2014/059929, 8 pages.
European Office Action dated Oct. 24, 2016 in European Patent Application No. 12850527.8, 5 pages.
Notice of Allowance dated May 24, 2016 in U.S. Appl. No. 13/299,856, 15 pages.
European Office Action dated Feb. 24, 2017 in European Patent Application No. 12847978.7, 5 pages.
Non-Final Office Action dated Dec. 30, 2016 in U.S. Appl. No. 14/084,365, 12 pages.
Zhongxu Hu et al, Computer vision for shoe upper profile measurement via upper and sole conformal matching, Optics and Lasers in Engineering 45 (2007) 183-190.
European Office Action dated Jul. 12, 2017 in European Patent Application No. 15002942.9, 5 pages.
Non-Final Office Action dated Apr. 11, 2017 in U.S. Appl. No. 14/468,521, 32 pages.
Final Office Action dated Apr. 21, 2017 in U.S. Appl. No. 14/084,365, 15 pages.
Non-Final Office Action dated Jun. 5, 2017 in U.S. Appl. No. 14/803,347, 10 pages.
Non-Final Office Action dated Sep. 28, 2017 in U.S. Appl. No. 14/084,365, 18 pages.
Non-Final Office Action dated Oct. 4, 2017 in U.S. Appl. No. 14/468,521, 32 pages.

\* cited by examiner

AUTOMATED MANUFACTURING OF SHOE PARTS

CROSS-REFERENCE TO RELATED APPLICATIONS

This application is a Continuation of U.S. patent application Ser. No. 13/299,819, and also entitled "AUTOMATED MANUFACTURING OF SHOE PARTS," and is related by subject matter to U.S. patent application Ser. No. 13/299,856, entitled "AUTOMATED IDENTIFICATION OF SHOE PARTS;" U.S. patent application Ser. No. 13/299,827, entitled "AUTOMATED 3-D MODELING OF SHOE PARTS;" U.S. patent application Ser. No. 13/299,872, entitled "AUTOMATED IDENTIFICATION AND ASSEMBLY OF SHOE PARTS;" U.S. patent application Ser. No. 13/299,908, entitled "MULTI-FUNCTIONAL MANUFACTURING TOOL;" U.S. patent application Ser. No. 13/299,934, entitled "MANUFACTURING VACUUM TOOL;" and U.S. patent application Ser. No. 13/299,890, entitled "HYBRID PICKUP TOOL." The entireties of the aforementioned applications are incorporated by reference herein.

BACKGROUND

Manufacturing a shoe typically requires various assembly steps, such as forming, placing, and assembling several parts. Some methods of completing these steps, such as those that rely heavily on manual execution, may be resource intensive and may have a high rate of variability.

SUMMARY

This summary provides a high-level overview of the disclosure and of various aspects of the invention and introduces a selection of concepts that are further described in the detailed-description section below. This summary is not intended to identify key features or essential features of the claimed subject matter, nor is it intended to be used as an aid in isolation to determine the scope of the claimed subject matter.

In brief and at a high level, this disclosure describes, among other things, manufacturing of a shoe in an automated fashion. For example, by analyzing an image of the shoe part, information describing the shoe part may be derived, such as an identification and orientation of a shoe part, shoe-part surface topography, shoe-part size, shoe-part alignment, etc. Based on the identification and the orientation, automated shoe-manufacturing apparatuses may be instructed to apply various shoe-manufacturing processes to the shoe part.

An exemplary system that manufactures shoes and/or shoe parts in an automated fashion may be comprised of various components, such as manufacturing stations, a part-recognition system, and shoe-manufacturing apparatuses and tools. In one exemplary aspect, the part-recognition system analyzes images of shoe parts to generate image-derived information (e.g., shoe-part identification, shoe-part orientation, surface topography, part alignment, part size, etc.). The image-derived information is used to instruct shoe-manufacturing tools that pickup, transfer, place, and attach shoe parts at desired positions.

An exemplary method for manufacturing a shoe part in an automated manner may comprise various steps. For example, a first shoe part may be positioned at a manufacturing station, such that a part-recognition system determines an identity of the first shoe part and determines an orientation of the first shoe part. In addition, a second shoe part may be retrieved from another manufacturing station, such that the part-recognition system determines an identity of the second shoe part and determines an orientation of the second shoe part. A part-manufacturing apparatus may be used to transfer the second shoe part from the second-shoe-part orientation to a subsequent orientation, which is determined based on the orientation and identity of the first shoe part. In addition, the part-manufacturing apparatus, which transferred the second part, may be used to temporarily attach the second shoe part to the first shoe part to maintain positioning for downstream processing.

In a further exemplary method for manufacturing a shoe part in an automated manner, a first shoe part may be positioned on a support surface at a first manufacturing station, such that the first shoe part is substantially flat on the support surface. In addition, a first automated part pickup tool may place a second shoe part on top of the first shoe part. A first automated attachment tool may attach the second shoe part to the first shoe, thereby forming an assembly of the first shoe part and the second shoe part. Moreover, the assembly may be moved to a second manufacturing station, such that a second automated part pickup tool places a third shoe part on top of the assembly, and a second automated attachment tool may attach the third shoe part to the assembly.

In another exemplary method for manufacturing a shoe part in an automated manner, a first shoe part may be positioned at a first manufacturing station, such that a part-recognition system determines an identity of the first shoe part and determines an orientation of the first shoe part. In addition, a second shoe part and third shoe part may be retrieved from another manufacturing station, such that the part-recognition system determines respective identities and respective orientations of the second shoe part and the third shoe part. A part-manufacturing apparatus may be used to sequentially transfer the second shoe part and the third shoe part from the respective orientations to respective subsequent orientations to be attached to the first shoe part based on the orientation and location of the first shoe part. In addition, the part-manufacturing apparatus, which sequentially transferred the second shoe part and the third shoe part, may be used to attach the second shoe part and the third shoe part to the first shoe part.

BRIEF DESCRIPTION OF THE SEVERAL VIEWS OF THE DRAWINGS

Illustrative aspects of the present invention are described in detail below with reference to the attached drawing figures, which are incorporated by reference herein, wherein.

DETAILED DESCRIPTION

The subject matter of certain aspects of the present invention is described with specificity herein to meet statutory requirements. But the description itself is not intended to define what is regarded as an invention, which is what the claims do. The claimed subject matter may comprise different elements or combinations of elements similar to the ones described in this document, in conjunction with other present or future technologies. Terms should not be interpreted as implying any particular order among or between various elements herein disclosed unless explicitly stated.

Figure 7:
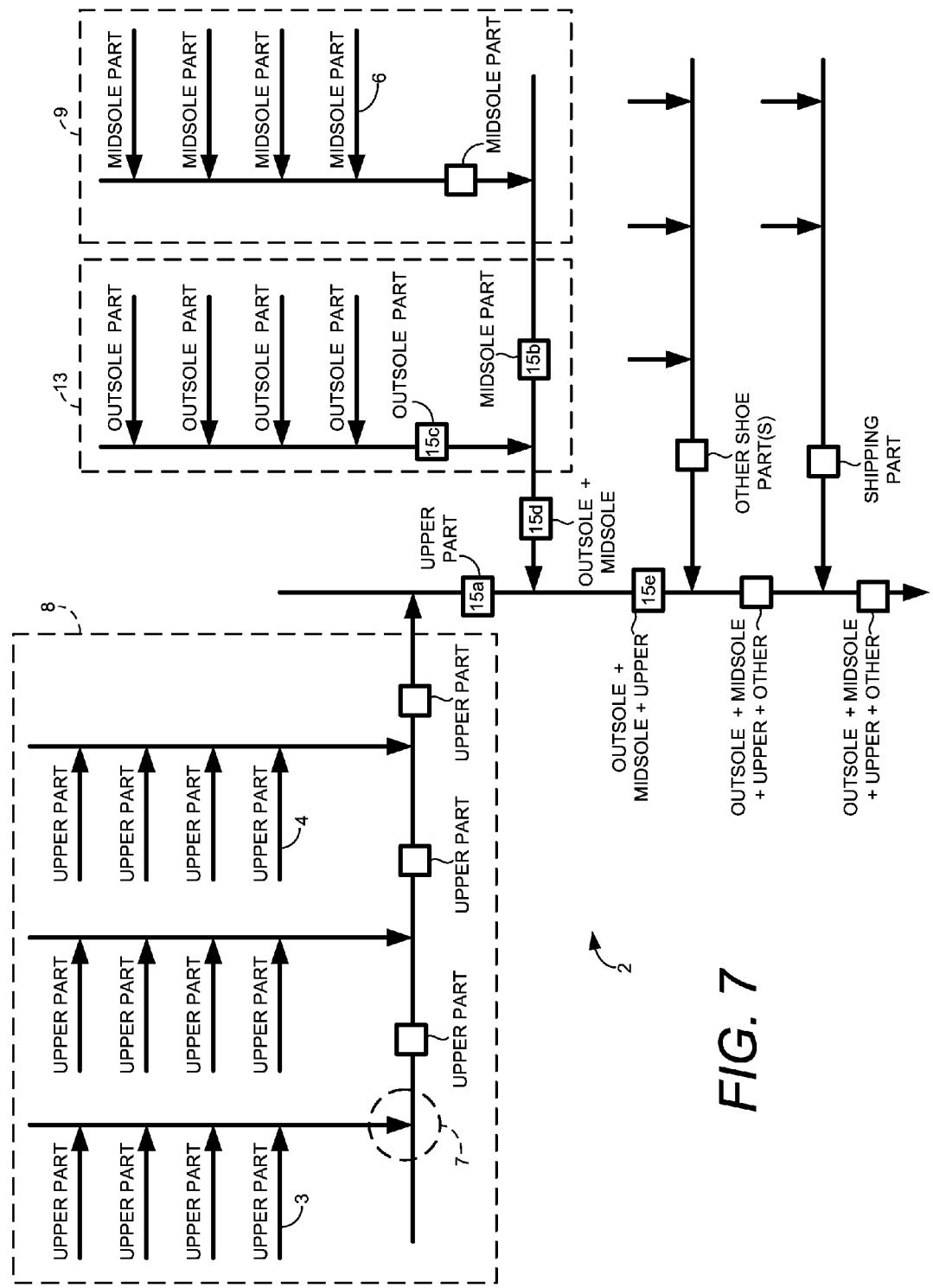
FIGS. 7 and 8 depict schematic diagrams of an overall process flow for manufacturing shoe parts in an automated manner in accordance with the present invention.

Subject matter described herein relates to automated manufacturing of shoe parts, and FIG. 7 depicts a schematic diagram of an overall process flow for an exemplary shoe-part manufacturing system 2. For example, FIG. 7 may illustrate a birds-eye perspective of various shoe-part-manufacturing apparatuses and processes that are depicted by various arrows.

Each arrow in FIG. 7 may represent a step, stage, and/or process, that is performed on one or more shoe parts or shoe-part assemblies and that may be performed in an automated manner, manually, or some combination thereof. Exemplary steps, stages, and/or processes may be comprised of cutting, stitching, attaching, stamping, molding, slicing, or otherwise making individual shoe parts. Other exemplary steps, stages, and/or processes may be comprised of moving or relocating a part, as well as placing a part with respect to another part (e.g., on top of another part). For example, system 2 may be comprised of part-moving apparatuses that sort a set of parts into subsets, which are moved along a designated path or stream within system 2. Additional steps, stages, and/or processes may be comprised of attaching one or more parts together, such as by stitching, adhering, sonic welding, melting, gluing, etc. These steps, stages, and/or processes that are listed are merely exemplary, and a variety of other shoe-manufacturing processes may be carried out by system 2 and the various stations (i.e., arrows) depicted therein. As such, system 2 depicts various processes that converge and combine to manufacture various shoe-part assemblies.

A variety of different shoe-manufacturing apparatuses may be utilized to carry out the various functions represented by the arrows depicted in FIG. 7. Shoe-manufacturing apparatuses may perform respective functions in an automated manner, may be used as an instrument to assist with manual execution, or may function in a manner that is both automated and manual. Exemplary shoe-manufacturing apparatuses may comprise a part-moving apparatus (e.g., conveyor system, motor-driven turntable, robotic arm, etc.); a part-pickup tool (e.g., vacuum tool, grasping tool, scooping tool, etc.); a part-attachment tool (e.g., sewing apparatus, sonic-welding tool, heat press, cold press, etc.); an image-capturing device (e.g., camera, video recorder, charge-coupled device, etc.); a laser; a light-emitting device (e.g., LED, fluorescent light bulb, full spectrum light bulb, color-specific light bulb, etc.); and a computing device. This list of shoe-manufacturing apparatuses is merely exemplary and a variety of other apparatuses may also be comprised in system 2. As such, one or more of these exemplary shoe-manufacturing apparatuses may be represented by an arrow in FIG. 7.

System 2 is comprised of various modular stations and components that may be moved from one position to another to perform the same or different tasks. For example, a certain modular component (e.g., pickup tool or part-moving apparatus) that operates at arrow 3 to process an upper part of a shoe upper may be interchangeable with a component that operates at arrow 4 or at arrow 6. Moreover, the various modular stations that comprise system 2 may be replaced or modified based on a particular type of shoe part on which the station is operating. For example, a shoe-part-manufacturing apparatus that operates at intersection 7 may be configured to process a certain type or style of shoe upper part, and the system 2 may be instructed to process a certain number of that type or style (e.g., 1000 units). However, after the certain number of parts is processed, the shoe-part-manufacturing apparatus that operates at intersection 7 may be reconfigured or modified to operate on a different style or type. Moreover, specific stations (i.e., arrows) may be added, subtracted, powered up, or powered down based on a certain style or type of shoe that is being manufactured. For example, although arrow 3 may be utilized when processing one type of shoe part, arrow 3 may be powered down or removed when system 2 is processing a different type of shoe part.

System 2 may also be comprised of shoe-part-specific groupings of apparatuses. For example, grouping 8 is comprised of upper-part-manufacturing apparatuses, grouping 9 is comprised of midsole-part-manufacturing apparatuses, and grouping 13 is comprised of outsole-part-manufacturing apparatuses. While FIG. 7 may depict a particular arrangement of groupings 8, 9, and 13, a variety of alternative arraignments may be utilized. For example, although FIG. 7 depicts a midsole part 15b being fed to grouping 13, in another aspect an outsole part may be fed to a midsole-part grouping 9. Moreover, an assembly of a midsole and outsole may be fed into a grouping 8 directed to upper-part assembly.

In a further aspect, information may be gathered at various stations that is utilized to carry out various shoe-manufacturing processes. For example, information may be derived by analyzing one or more images that depict a representation of a shoe part and/or assembly of shoe parts. In addition, information may be derived by projecting a laser onto a shoe part, capturing an image of the projected laser line, and analyzing the image. Exemplary information that may be gathered may describe various aspects of a shoe part, such as a size, shape, surface topography, placement, orientation, rotation, alignment, etc.

Accordingly, in a further aspect, once information has been generated, collected, or derived, the information may be shared among components of each grouping. For example, information (e.g., shoe-part identity, shoe-part orientation, shoe-part size, etc.) may be communicated among the various shoe-manufacturing apparatuses (e.g., arrows) depicted in grouping 8. Moreover, information derived in one grouping may be shared with another grouping. For example, information about a midsole assembly (e.g., information describing a size of a midsole assembly) may be derived from shoe-manufacturing apparatuses in grouping 9 and then shared with grouping 13 in order to instruct processes directed to outsole-part manufacturing. Furthermore, information derived from groupings 9 and 13 may be combined to instruct steps directed to combining a midsole and an outsole. In a further aspect, information derived from grouping 9 and/or 13 may be communicated to grouping 8 to instruct operations directed to upper-part construction. A variety of other types of information may be shared among the various components of system 2 to enable system 2 to carry out shoe-manufacturing processes in an automated manner.

The arrangement of arrows as depicted in system 2 is exemplary and the arrows (i.e., manufacturing stages) may be rearranged in various other configurations. For example, system 2 may be comprised of a circular track (e.g., conveyor system) that has manufacturing arms or spokes (e.g., other conveyor systems) feeding into a central circular track or feeding outward towards a circumscribing circular track. In another exemplary system, a main track may be arranged in a zigzag pattern that traverses from one station to the next. Again, these described arrangements are merely examples, and a variety of other arrangements may be utilized.

FIG. 7 depicts that system 2 may be comprised of an upper-part grouping 8 of components that are directed to manufacturing an upper-part of a shoe assembly. As such, each arrow in grouping 8 may feed a different upper part (e.g., base layer, mesh layer, adhesive layer, eyelet reinforcement, support layer, aesthetic layer, etc.) into the overall upper-part assembly and/or may carry out a respective function. Exemplary functions may comprise cutting a part, identifying a part, determining a location and orientation of a part, moving a part to a placement with respect to another part, stacking a part, and attaching the part to another part. Accordingly, an overall upper-part assembly 15*a* may be constructed by grouping 8 and transferred downstream to one or more other groupings. As already described, information (e.g., sizing, shape, position, style, color, etc.) that describes the overall upper-part assembly 15*a* may be derived from grouping 8 (such as by using a 2-D or 3-D image-analysis system) and may be passed downstream in coordination with assembly 15*a*.

FIG. 7 further depicts that grouping 9 is comprised of multiple midsole-part components that coordinate to create a midsole part 15*b*. Exemplary midsole-part components (e.g., arrows in grouping 9) may provide respective midsole parts and perform respective functions. Exemplary functions may comprise cutting a part, molding a part, painting a part, identifying a part, determining a location and orientation of a part, stacking a part, moving a part to a placement with respect to another part, and attaching the part to another part. Various midsole parts may be integrated and assembled in grouping 9, such as cushioning elements, support elements, and/or torsion-control elements. Examples of midsole components may comprise foam, rubber, and/or other polymers having various qualities, air pockets, phylon elements, and/or other molded components. Information describing midsole part 15*b* may be derived from grouping 9 (such as by using a 2-D or 3-D image-analysis system) and may be passed downstream in coordination with assembly 15*b*.

FIG. 7 also depicts that grouping 13 is comprised of multiple outsole-part components that coordinate to create an outsole part 15*c*. Exemplary outsole-part components (i.e., arrows included in grouping 13) may provide respective outsole parts and perform respective functions. Exemplary functions may comprise cutting a part, molding a part, painting a part, identifying a part, determining a location and orientation of a part, stacking a part, moving a part to a placement with respect to another part, and attaching the part to another part. Various outsole parts may be integrated and assembled in grouping 13, such as traction/tread elements, support elements, cushioning elements, and protective elements. Examples of outsole components may comprise foams, rubbers, phylon, and other polymer-based materials having various qualities. Information describing outsole part 15*c* may be derived from grouping 13 (such as by using a 2-D or 3-D image-analysis system) and may be passed downstream in coordination with assembly 15*c*.

FIG. 7 further depicts that a midsole part may be combined with an outsole part to make an outsole-and-midsole assembly 15*d*. Moreover, information derived from grouping 13 may be combined with information derived from grouping 9 and communicated downstream in coordination with the outsole-and-midsole assembly 15*d*. In a further aspect, an outsole-and-midsole assembly may be combined with an upper part (e.g., lasted or unlasted) to create an assembly 15*e* having an outsole, a midsole, and an upper. Again, information derived from each respective grouping may be passed along in coordination and compiled at each station.

Once an upper, a midsole, and an outsole have been assembled, various other shoe-manufacturing processes may be carried out by system 2. For example, quality checks may be performed by system 2. Moreover, other parts may be added to the assembly, such as laces or certain aesthetic elements. In addition, processes (e.g., packaging, cleaning, etc.) may be carried out by system 2 that prepare a shoe to be transported or shipped to another location.

Figure 8:
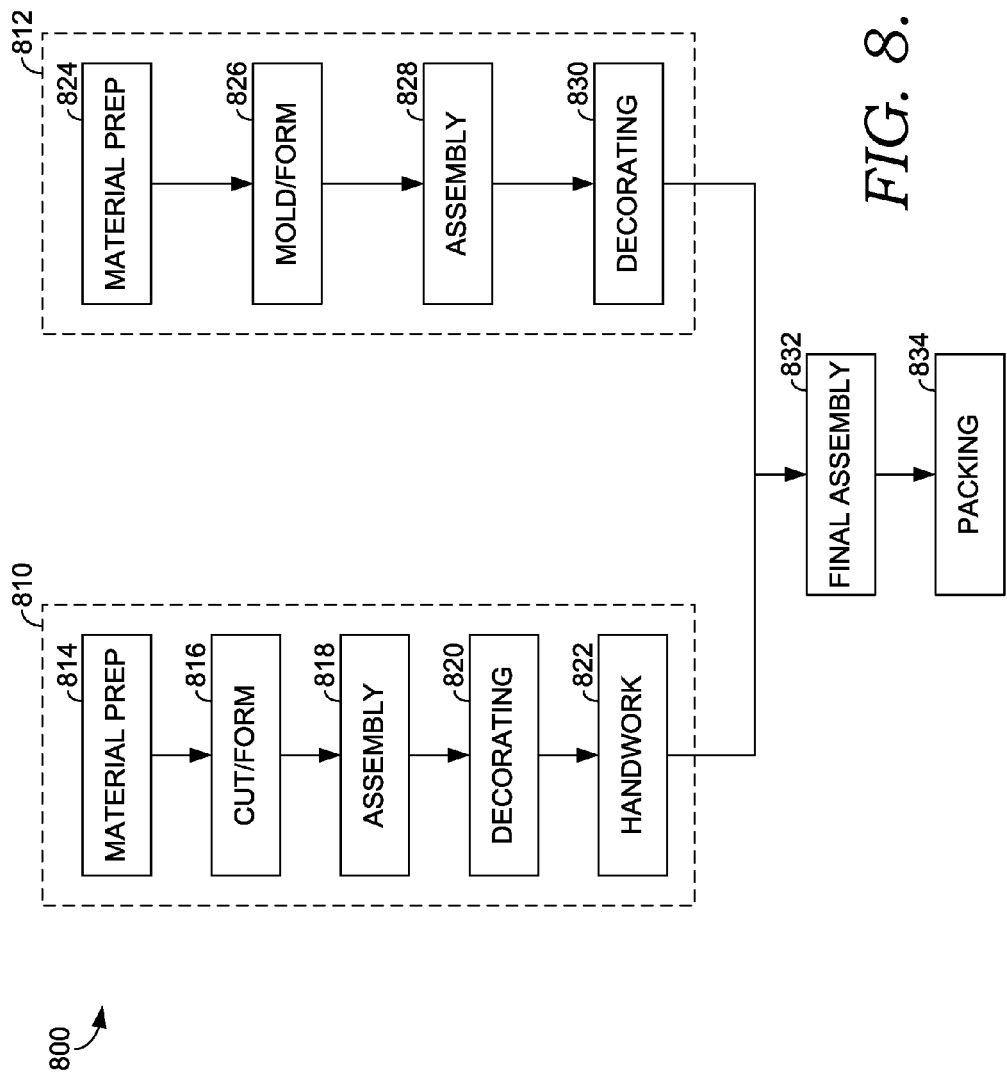

FIG. 8 depicts a schematic diagram of another exemplary overall process flow for a shoe-part manufacturing system 800. The system 800 may comprise an upper manufacturing system 810 (hereinafter referred to as the upper system 810) as well as a bottom manufacturing system 812 (hereinafter referred to as the bottom system 812). The upper system 810 may comprise a material prep station 814, a cut/form station 816, an assembly station 818, a decorating station 820, and/or a handwork station 822. Manufacturing steps performed at these stations may include manual manufacturing steps, automated manufacturing steps, and/or a combination of both manual and automated manufacturing steps. Further, although the upper system 810 is depicted as comprising five stations, the upper system 810 may comprise additional stations. Alternatively, the upper system 810 may comprise less than five stations. Additionally, manufacturing steps performed at one station may be performed at a different manufacturing location or facility than the other stations. Further, one or more stations could be combined such that manufacturing steps associated with individual stations are combined at the combined station(s).

Exemplary functions performed at the material prep station 814 may include assembling and organizing materials that will be used in shoe-upper construction, pre-treating materials where appropriate, and stacking materials. Exemplary functions performed at the cut/form station 816 may include die-cutting shapes, molding shapes, casting shapes, and/or knitting shapes. Continuing, exemplary functions performed at the assembly station 818 may include assembling the different shapes received from the cut/form station 816 into a shoe upper. Assembly may comprise stitching, fusing, welding, attaching, gluing, heat pressing, and the like.

After the shoe upper is assembled at the assembly station 818, it may continue on to the decorating station 820. Exemplary functions performed at the decorating station 820 may include high frequency (HF) embossing, spray painting, screen printing, and/or digital painting. Next, the shoe upper may proceed on to the handwork station 822. Exemplary functions performed at the handwork station 822 may include stitch closure, strobal attachment, and/or lasting. After processing at the handwork station 822, the shoe upper may proceed on to a final assembly station 832. This aspect will be explained in greater depth below. In one aspect, manufacturing steps performed at the upper system 810 take place in two-dimensional (2-D) space. Thus, shape recognition technologies may focus on recognizing shoe upper components in 2-D space.

Turning now to the bottom system 812, the bottom system may comprise a material prep station 824, a mold/form station 826, an assembly station 828, and/or a decorating station 830. Manufacturing steps performed at these stations may include manual manufacturing steps, automated manufacturing steps, and/or a combination of both manual and automated manufacturing steps. Further, although the bottom system 812 is depicted as comprising four stations, the bottom system 812 may comprise additional stations. Alternatively, the bottom system 812 may comprise less than four stations. Additionally, manufacturing steps performed at one station may be performed at a different manufacturing location or facility than the other stations. Further, one or more stations could be combined such that manufacturing steps associated with individual stations are combined at the combined station(s).

Exemplary functions performed at the material prep station 824 may include assembling and prepping materials to be used for midsole construction and outsole construction. This may include, for example, assembling and/or manufacturing rubberized pellets to be used for molding midsoles and/or outsoles, assembling sheets of material (e.g., rubber, foam, polyurethane), and/or stacking such materials. At the mold/form station 826, the midsole and outsole are molded or formed out of the assembled materials. For instance, the rubberized pellets may be deposited in a mold and heat applied to form the pellets into a midsole and/or outsole. As well, the midsole and/or outsole may be die-cut from materials such as foam and/or rubber. After die-cutting, the materials may be further processed by molding the material into a desired shape for the midsole and/or outsole by, for example, applying heat. Additional functions may include removing the midsole and/or outsole from molds.

Next, the midsole and/or outsole may proceed to the assembly station 828 where the midsole and outsole are joined together by utilizing attachment technologies such as, for example, adhesive. Various midsole parts may also be integrated into the midsole/outsole complex. These may include cushioning elements, support elements, and/or torsion-control elements. In one aspect, adhesive is applied to the outsole and the midsole is pressed into the outsole (e.g., a predetermined pressure is applied for a predetermined amount of time to the midsole/outsole assembly to facilitate adhesion). Heat may or may not be applied in this process to facilitate adhesion. Next, the midsole/outsole complex may proceed to the decorating station 830 where the midsole may be spray painted. The midsole/outsole complex may then proceed to the final assembly station 832. In one aspect, manufacturing steps performed at the bottom system 812 take place in three-dimensional (3-D) space. Thus, shape recognition technologies may focus on recognizing shoe midsole and outsole components in 3-D space.

Exemplary functions performed at the final assembly station 832 may include attaching the shoe upper to the midsole/outsole complex. Such attachment may occur, for example, by the application of an adhesive, pressure, and/or heat. Next, the completed shoe proceeds to a packing station 834 where the shoe is boxed and readied for shipping. In one aspect, the final assembly station 832 and the packing station 824 may be combined into a single station. As well, the final assembly station 832 and/or the packing station 834 may be located at another manufacturing location or facility than the other stations. The process flow depicted in FIGS. 7 and 8 may be extended to manufacturing any number of soft pieces in a flat arrangement using welding and/or stitching. For example, the upper system 810 described in FIG. 8 may be applied to manufacturing items such as purses, duffle bags, backpacks, and clothing articles.

Quality control, either manual or automated, may occur throughout the system 800. For example, with respect to the upper system 810, 2-D recognition technology may be employed to ensure that parts or shapes are properly placed and/or stacked during the assembly process. As well, with respect to the bottom system 812, 3-D recognition technology may be employed to ensure that the midsole and/or outsole are properly formed and/or aligned with each other when the midsole is attached to the outsole. A final quality control check may occur after final assembly but before packing.

Figure 1:
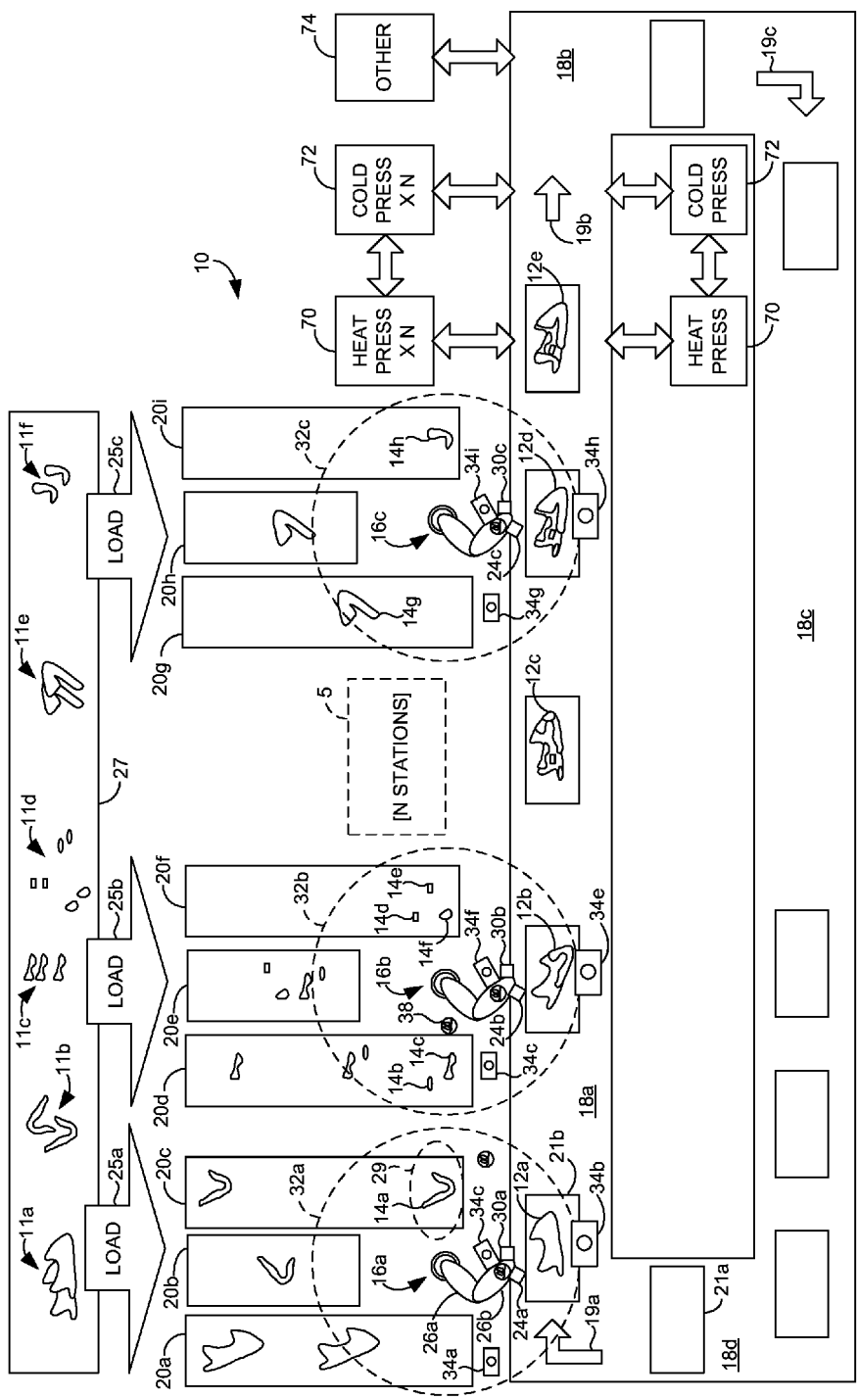
FIGS. 1, 2, and 3 depict schematic diagrams of exemplary systems for manufacturing shoe parts in an automated manner in accordance with the present invention.

Referring now to FIG. 1, a grouping of shoe-part-manufacturing apparatuses is illustrated as part of an exemplary shoe-part manufacturing system 10, which is depicted from a birds-eye perspective. System 10 is comprised of various automated manufacturing apparatuses and tools, which may function to, among other things, position and assemble shoe parts. Moreover, system 10 may be comprised of one or more stations, which are arranged in an order that may be at least partially automated. For example, FIG. 1 depicts three general stations, as well as a box 5 that represents a placeholder of other potential stations. As such, although three general stations are depicted in FIG. 1, system 10 may be comprised of additional stations. In addition, the three depicted stations are exemplary, and system 10 may also have fewer stations such as, for example, two stations. Moreover, each of the general stations may be comprised of various stations. For example, the components depicted by reference numerals 20a-i and 27 may each be considered a station. In an exemplary aspect, system 10 of FIG. 1 may be part of system 2 depicted in FIG. 7 or system 800 depicted in FIG. 8.

Prior to being assembled, shoe parts 11a-f may be maintained at a part-loading station 27. Part-loading station 27 may be a motionless surface, such as a table or workbench, from which parts are transferred to part-feeding apparatuses 20a-i. For example, parts 11a-f may be manually loaded onto part-feeding apparatuses 20a-i. In addition, part-loading station 27 may be comprised of a conveyor belt or other automated apparatus for moving parts. For example, part-loading station 27 may move parts 11a-f onto part-feeding apparatuses 20a-i in an automated manner. Parts 14a-h are depicted on part-feeding apparatuses 20a-i and illustrate parts that may have been automatically or manually transferred from part-loading station 27.

Parts 11a-f and 14a-h may be cut or otherwise prepared to be incorporated or assembled into another shoe part. For example, in one aspect parts 11a-11f and 14a-h may have been automatically cut from a stock material using an automatic-cutting tool. An exemplary automatic-cutting tool may comprise a sharp edge that is shaped to match an outline of a shoe part and that is pressed into a stock material. When an automatic-cutting tool is used, system 10 may derive a part identity, part location, a part rotation, and/or a part size from the automatic-cutting tool. For example, an automatic-cutting tool may record a size and shape of the cutting pattern used to create the shoe part and communicate the recorded information to system 10, thereby apprising the system 10 of the identity and/or size of the cut shoe part. Moreover, an automatic-cutting tool may record a location at which a cutting step was executed, as well as a rotation of a cutting instrument when the cutting step was executed, and communicate this recorded information to system 10, thereby informing the system 10 of the orientation (e.g., coordinate position and rotation) of the cut shoe part within the system. In an exemplary aspect, this part-identity information and part-orientation information, which may be derived from a cutting tool, may be used to determine a position at which system 10 places a part and attaches a part.

In a further aspect, system 10 may be used to combine parts 11a-f and 14a-h in a manner depicted by parts 12a-e. As such, shoe parts 11a-f, 12a-e, and 14a-h may be comprised of a single part or of a plurality of assembled parts. For example, shoe parts 11a-f, 12a-e, and 14a-h may be comprised of one or more layers of flexible material, such as textile, leathers, TPU, materials, etc. Shoe parts 11a-f, 12a-e, and 14a-h may be physical structures of a completed shoe and/or components thereof, such as an adhesive (or other attachment means) that may be used to join shoe components during a shoe manufacturing process. In one exemplary aspect, shoe parts 11a-f, 12a-e, and 14a-h represent different pieces of a shoe upper that are assembled prior to molding the shoe upper for attachment to other shoe parts. The shapes and combinations depicted by shoe parts 11a-f, 12a-e, and 14a-h are merely exemplary.

As indicated system 10 also may be comprised of part-feeding stations 20a-i, which make parts available to be used in a shoe-manufacturing process. For example, parts 11a-f may be loaded (e.g., illustrated by arrows 25a-c) onto part-feeding stations 20a-i from part-supply station 27. Part-feeding stations 20a-i may be fixed stations that support shoe parts in a stationary position to be either manually or automatically retrieved. For example, stations 20a-i may comprise tables, workbenches, or other motionless support elements. As such, parts may be placed on these fixed stations in a part-pickup zone (e.g., 29) to be either manually or automatically retrieved. Alternatively, stations 20a-i may be comprised of feeding apparatuses (e.g., conveyors) that move parts, which are loaded from part-supply station 27, into a part-pickup zone (e.g., 29), from which parts are either manually or automatically transferred. If information that describes a part has been recorded, such as an identity, size, and orientation, this information may be passed along with the part as it travels from one position to the next within system 10. For example, if a part-feeding station is comprised of a conveyor system, a known movement pattern of the conveyor system may be combined with an initial position of a shoe part (e.g., as determined by an automatic cutting tool) to determine a subsequent position to which the part has been moved by the conveyor system.

System 10 may transfer shoe parts from part-feeding stations 20a-i in various manners. In one aspect, shoe parts may be manually transferred from part-feeding stations 20a-i. For example, shoe part 12a may have been manually placed on tray 21b in a position that allows shoe-manufacturing apparatus 16a to act on shoe part 12a. In addition, shoe part 14a may be manually placed on top of shoe part 12a to allow shoe parts 12a and 14a to be assembled. Alternatively, shoe parts may be transferred from part-feeding stations 20a-i in an automated manner, such as by using shoe-manufacturing apparatuses 16a-c. For example, shoe-manufacturing apparatus 16a may have transferred shoe part 12a from part-feeding station 20a onto tray 21b. Shoe-manufacturing apparatus 16a may also transfer part 14a onto part 12a and then attach part 14a onto part 12a.

Shoe-manufacturing apparatuses 16a-c may be comprised of various components or tools that are used to carry out various shoe-manufacturing steps, such as picking up, transferring, positioning, placing, attaching, spraying, cutting, coloring, printing, etc. FIG. 1 depicts circles 32a-c that represent exemplary operating areas in which shoe-manufacturing apparatuses 16a-c may move and carry out various functions. Moreover, shoe-manufacturing apparatuses 16a-c, as well as tools that may be incorporated therein, may manipulate and act on shoe parts in an automated manner. For example, shoe-manufacturing apparatuses 16a-c may carry out automated steps based on information that is communicated to apparatuses 16a-c and that described characteristics (e.g., identity, position, rotation, etc.) of the shoe parts. Moreover, the term "shoe-manufacturing apparatus" describes an apparatus that may manufacture shoes, shoe parts, or a combination thereof. As such, the terms "shoe-manufacturing apparatus," "shoe-part-manufacturing apparatus," and "part-manufacturing apparatus" may be used interchangeably throughout this disclosure and the claims that follow.

Shoe-manufacturing apparatuses 16a-c may be comprised of various tools that are arranged at various positions on moveable extensions or arms. Exemplary arms or extensions may be multi-axis and may move in various planes or directions in order to position a tool to operate on a shoe part. For example, apparatuses 16a-c may be comprised of a set of a 4-axis arm extensions or a set of 6-axis arm extensions.

In a further aspect, a variety of different tools may be integrated with apparatuses 16a-c. For example, apparatuses 16a-c may be comprised of an automatic cutting tool that is used to cut a shoe part from a stock material. As previously described, an exemplary automatic cutting tool may be comprised of a sharp edge that is pressed into the stock material. Moreover, information derived from the automatic cutting tool may be communicated to the apparatuses 16a-c to apprise the apparatus of the part identity, location, size, orientation, etc. Apparatuses 16a-c may also be comprised of a pick-up tool that functions to pick up a shoe part from a part-feeding apparatus. For example, a pick-up tool may apply a pick-up force, such as by applying suction, grasping, gripping, adhering, scooping, etc. In one aspect, a cutting tool and a pick-up tool may function in a cooperative manner. For example, once a cutting tool has executed a cutting pattern in a stock material to form a shoe part, a part-pickup tool may apply a suction to the shoe part and/or a force against the stock material to separate the formed shoe part from the stock material.

In an exemplary aspect, system 10 may comprise a part-recognition system that determines characteristics of some or all of the various parts being manipulated. For example, the part-recognition system may determine characteristics of parts that are loaded onto a part-feeding station 20a-i, that are picked up by a shoe-manufacturing apparatus 16a-c, or that have already been transferred onto surfaces 18a-d or trays 21a-b. Exemplary characteristics that may be determined by the part-recognition system may be a part identity, a part location within the operating area (e.g., circle 32), an amount of part rotation within the operating area, a placement location within the operating area to which a part will be transferred, and an attachment location within the operating area at which a part will be attached to another part.

System 10 may comprise more than one part-recognition system, such that each part-recognition system determines characteristics of a particular grouping of parts. For example, a first part-recognition system may determine characteristics of parts located within area 32a, whereas a second part-recognition system may determine characteristics of parts located within area 32b. Accordingly, the multiple part-recognition systems may communicate with one another as parts move from one station to another. Alternatively, system 10 may be comprised of a single part-recognition system that determines characteristics of parts in each of the areas 32a-c. In an exemplary aspect, at least a portion of a part-recognition system comprises a computing device that executes computer instructions. For example, the computer instructions may be stored in a computer storage media and executed by a processor of the computing device.

The part-recognition system may comprise image recorders 34a-i (e.g., cameras or video recorders) positioned throughout system 10. Image recorders 34a, 34d, and 34g represent below-mounted recorders, which may capture images of parts held being transferred by shoe-manufacturing apparatuses 16a-c. In addition, image recorders 34b, 34e, and 34h represent above-mounted recorders, which may capture images of parts positioned above on surfaces 18a-d or trays (e.g., 21a and 21b). Moreover, image recorders 34c, 34f, and 34i represent an apparatus-mounted recorder, which is mounted to a respective one of shoe-manufacturing apparatus 16a. Recorders 34c, 34f, and 34i may record images of parts positioned at part-feeding stations 20a-i or that have already been transferred. Recorders 34a-i and their respective positions are merely exemplary, and system 10 may comprise more or fewer recorders that are arranged in different positions.

In one exemplary aspect, the part-recognition system derives information from the recorded images. For example, an identity of a part may be derived from an image by applying a part-recognition protocol. In addition, an orientation (e.g., position and amount of rotation) of a part with respect to a work area 32a-c may be derived. Such information may be used to determine placement position of parts, as well as attachment positions. Accordingly, the placement position and attachment positions may be used to instruct shoe-manufacturing apparatus 16a-c.

In another exemplary aspect, various light-emitting devices 34 may be positioned throughout system 10. Light-emitting devices 34 may help to create a contrast between a part, which is being captured in an image, and an environment or background that surrounds the part. Such a contrast may assist the part-recognition system with determining a boundary and/or identity of the part. As such, light-emitting devices may be positioned to provide a back light behind a part or to illuminate a front surface of the part. In a further aspect, lasers may be positioned throughout system 10 and may function to project a laser line onto a shoe part. As such, images may be recorded that depict the projection of the laser line across the shoe part; the images are subsequently analyzed to derive shoe-part information.

In an exemplary aspect, each shoe-manufacturing apparatus 16a-c may be comprised of movable arms 26a-b, which may rotate or extend/retract to enable the apparatus to reach a desired position. Arms 26a-b are generally depicted as connected by a single joint; however, arms 26a-b may be comprised of multiple articulations that enable each arm to move in a variety of directions.

Moreover, each shoe-manufacturing device may have a part-pickup tool 24a-c, which is capable of picking up one or more parts from a part-feeding station 20a-i. Exemplary part-pickup tools may pick up the one or more shoe parts by applying various techniques, such as grasping, applying suction, adhering, scooping, etc. In another aspect, characteristics of a shoe part may help to facilitate picking up the shoe part. For example, a shoe part may have a tab or other structure with which a part-pickup tool engages. In another example, a shoe part may have a pre-laminated film or other composition that provides an amount of tackiness or stickiness, which may provide a releasable adherence to the pickup tool. Accordingly, once the part-recognition system has notified a shoe-manufacturing apparatus of a shoe-part position on part-feeding station 20a-i, the part-pickup tool 24a-c may be used to pick up the shoe part from that shoe-part position.

In a further aspect, each part-pickup tool is capable of releasing a part when the part is positioned at a desired location, such as on top of part 12a. Releasing a part may be passive, such as by simply releasing a grip, suction, or other holding technique. The passive release of a part may be assisted by a degree of suction applied to the underneath of the trays 21a-e which helps to "capture" the part after it has been released. In addition, releasing a part may be more active, such as by applying a force or pressure (e.g., blown air) against the released part and towards the element onto which the released part may be positioned. Accordingly, once the part-recognition system has notified a shoe-manufacturing apparatus of a placement position at which a shoe part should be placed, the part-pickup tool 24a-c may be used to release the shoe part at that placement position.

Part-pickup tools 24a-c may each have a same design, or respective designs may vary between apparatuses. For example, pickup tool 24a may be different from both pickup tools 24b and 24c. In one aspect, pickup tools 24a-c are selected and implemented based on characteristics of shoe part that will be made available at a part-feeding station 20a-i. Exemplary characteristics that may determine a type of pickup tool are size, shape, weight, profile, etc. For example, if parts 12a and 14a are bigger than other parts manipulated in system 10, such as parts 14b-f, pickup tool 24a may be designed to pickup larger shoe parts and pickup tool 24b may be designed to pickup smaller shoe parts. Moreover, part-pickup tools 24a-c may be a combination of part-pickup tools, such that each tool of the combination is designed to pick up a different sized shoe part. For example, a part-pickup tool may have one tool that picks up larger shoe parts and another part that picks up smaller shoe parts, such that the part-pickup tool may be considered a hybrid part-pickup tool.

In a further aspect, each shoe-manufacturing apparatus 16a-c may comprise a part-attachment tool 30a-c, which operates to attach shoe parts to one another. For example, a part-attachment tool 30a may attach part 14a onto part 12a after part 14a has been placed onto part 12a. Various attachment methods and techniques may be applied by part-attachment tools 30a-c, such as adhering, stitching, sonic welding, heat press, cold press, etc. Moreover, each part-attachment tool may have a different configuration based on the parts to be coupled. That is, part-attachment tool 30a may have a different configuration than part-attachment tool 30b. As such, in an exemplary aspect, once the part-recognition system has determined a part-attachment location, a part-attachment tool 30a-c may be used to attach shoe parts in an automated manner. In one aspect, the shoe parts are temporarily attached in order to maintain positioning for downstream processing.

FIG. 1 depicts that shoe parts 12a-e may be moved through a series of manufacturing processes by which other shoe parts (e.g., 14a-h) may be added thereto. For example, shoe parts 12a-e may be flatly arranged on surfaces 18a-d, such that shoe parts 14a-h are placed on an upper facing surface of shoe parts 12a-e. That is, in an exemplary aspect, shoe-manufacturing apparatuses 16a-c may be used to place shoe part 12a onto surface 18a or tray 21b and to position shoe parts 14a-h respective to shoe part 12a.

As depicted in FIG. 1, system 10 may be comprised of one or more part-support surfaces 18a-d, which may support shoe parts 12a-e when the shoe parts are positioned to be acted upon by shoe-manufacturing apparatuses 16a-c. For illustrative purposes, arrows 19a-c are depicted to indicate a possible direction in which shoe parts are moved from one shoe-manufacturing apparatus to another. Accordingly, stations may be set up along the path depicted by arrows 19a-c.

Part-support surfaces 18*a-d* may be comprised of various non-moving surfaces, such as tables or workbenches. As such, parts 12*a-e* may be manually transferred from one position to the next to be sequentially acted upon by part-manufacturing apparatuses. In addition, part-support surfaces 18*a-d* may be comprised of a series of movable surfaces, such as conveyors that transfer shoe parts from one position to a next in an automated manner. The rectangular path of surfaces 18*a-d* depicted in FIG. 1 is merely exemplary, and surfaces 18*a-d* may be arranged in any configuration, which may be comprised of more or fewer surfaces.

System 10 may also comprise support trays 21*a-b* onto which shoe parts are placed. Trays 21*a-b* may be helpful in various instances. For example, a tray may help facilitate transfer of a shoe part from one moving conveyor 18*d* to another moving conveyor 18*a*. In addition, a tray may have various features that assist to hold a shoe part in a desired position. For example, a top side of a tray may have an amount of tackiness that helps to prevent a shoe part from sliding. In addition, a top side of a tray may receive pins or other temporary fasteners, which are positioned through the shoe part to hold the shoe part in place. In another aspect, a tray may have a series of apertures spaced throughout, such that a suction force, which is generated on an underneath side of the tray, may be applied to a shoe part positioned on a top side of the tray. A suction force utilized in such a manner (i.e., on the underneath side of tray) may help to hold a shoe part in a desired position when the shoe part is being acted upon by a shoe-manufacturing apparatus 16*a-c*. As well, the suction force may be utilized to assist in the passive release of a shoe part by shoe-manufacturing apparatuses 16*a-c*.

In an exemplary aspect, steps taken to secure a shoe part to a tray may be timed and executed in coordination with a release or placement by part-pickup tool 24*a-c*. That is, as previously described, part-pickup tool 24*a-c* may passively release a shoe part, or may actively apply a force or pressure against a shoe part, in order to place a shoe part at a desired position. Accordingly, a suction or other implementation applied to a tray to hold a shoe part in position on the tray may be timed to allow the shoe part to be passed off from the part-pickup tool to the tray.

As previously described, system 10 may be comprised of one or more assembly stations, which are arranged in an assembly line that may be at least partially automated. FIG. 1 depicts three exemplary stations, as well as a box 5 that represents a placeholder for other potential stations. As such, although only three stations are depicted in FIG. 1, system 10 may comprise additional stations. In addition, the three depicted stations are exemplary, and system 10 may also comprise fewer stations.

System 10 may further be comprised of one or more heat presses 70 and one or more cold presses 72. The heat presses 70 and cold presses 72 may be arranged in any order to carry out desired shoe-part assembly. For instance, heat presses 70 and cold presses 72 may be aligned on either side part-support surfaces 18*a-d* to facilitate faster assembly. Heat applied by heat press 70 may further activate adhesive elements positioned among a compilation of parts that comprise shoe part 12*e*. By applying pressure to both part 12*e* and the heat activated elements, the compilation of parts may be pressed into a more compact layer of shoe parts. Applying a cold press 72 to part 12*e* after heat press 70 may then cause the adhesive elements to solidify and/or set, thereby holding the compilation of parts together.

System 10 may comprise a variety of other 74 manufacturing apparatuses or stages. For example, system 10 may comprise a quality control station that enables manual or automated inspection of shoe parts. System 10 may also comprise a station at which part 12*e* is assembled with or attached onto another shoe part. Moreover, system 10 may comprise a station at which shoe part 12*e* is buffed, molded, cut, decorated, and/or further processed.

In a further aspect, station 74 may represent a removal of a shoe part from surface 18*a-d* or from a tray (e.g., 21*a-b*). For example, a part may be removed to be stacked with other similar parts or to be transferred to another shoe-part manufacturing system, which executes other shoe-manufacturing processes. As such, a shoe part may be lifted off of a tray (e.g., 21*a-b*) at station 74. In an exemplary aspect, a shoe part may be constructed using a type of hot melt, which may stick to a tray or other surface that supports the shoe part. As such, trays 21*a-b* may have a mechanism or feature to secure or fix the trays 21*a-b* to surface 18*a-d* and to help prevent a shoe part from sticking to the tray. In an exemplary aspect, a tray may have a flange or other structural element that may be used to hold the tray down (i.e., against a support surface such as 18*a-d*) when a shoe part is picked up off the tray.

Various methods and steps may be performed by system 10. Generally, a first shoe part 12*a* may be positioned on a support surface 18*a* or 21*b* and at a first manufacturing station, wherein the first shoe part is substantially flat on the support surface. In addition, a first automated part pickup tool 24*a* may place a second shoe part 14*a* on top of the first shoe part, and a first automated attachment tool 30*a* may attach the second shoe part to the first shoe, thereby forming an assembly (e.g., 12*b*) of the first shoe part and the second shoe part. As used throughout this application, the term "attach" may mean permanent attachment or temporary attachment in order to maintain positioning for downstream processing. In a further step, the assembly is moved to a second manufacturing station (as depicted by part 12*b*), such that a second automated part pickup tool 24*b* places a third shoe part 14*b* or 14*c* on top of the assembly 12*b* of the first shoe part and the second shoe part. Subsequently, a second automated attachment tool 30*b* may attach the third shoe part to the assembly of the first shoe part and the second shoe part.

Other methods may also be performed by system 10. For example, support surface 18*a-d* (e.g., conveyor) may move a tray 21*a-b* into position to receive a shoe part (e.g., 12*a*). A part-recognition system may identify part 12*a* and determine a location and orientation of part 12*a* within area 32*a*. Based on the location and orientation, a placement position and attachment position of other shoe parts may be determined. The part-recognition system may determine an identity, location, and orientation of part 14*a*. Part 14*a* may be picked up by tool 24*a*, transferred by parts 26*a-b* to the placement position, and attached at the attachment position by tool 30*a*. Part 12*b* provides an exemplary illustration of part 12*a* and part 14*a* assembled into a shoe part.

Once assembled, shoe part 12*b* may be transferred by surface 18*a-d* to another position near shoe-manufacturing apparatus 16*b*. As such, part-recognition system may determine an identity of part 12*b* and an orientation and location of part 12*b* within area 32*b*. Based on the identity, location, and orientation, respective placement positions and respective attachment positions of other shoe parts 14*b-e* may be determined. The part-recognition system may determine an identity and orientation of parts 14*b-e*. Parts 14*b-e* may then be sequentially picked up by tool 24*b*, sequentially transferred to the respective placement positions, and sequentially attached at the respective attachment positions by tool 30*b*. Part 12*c* provides an exemplary illustration of part parts 12*b* and 14*b-e* assembled into a shoe part. Shoe part 12*c* may be transferred to subsequent stations (e.g., near shoe-manufacturing apparatus 16*c*) to be manipulated and assembled to together with additional parts (e.g., 14*g* and 14*h*). For example, shoe part 12*e* provides an exemplary illustration of an assembly including parts similar to 12*a* and 14*a-h*.

Figure 2:
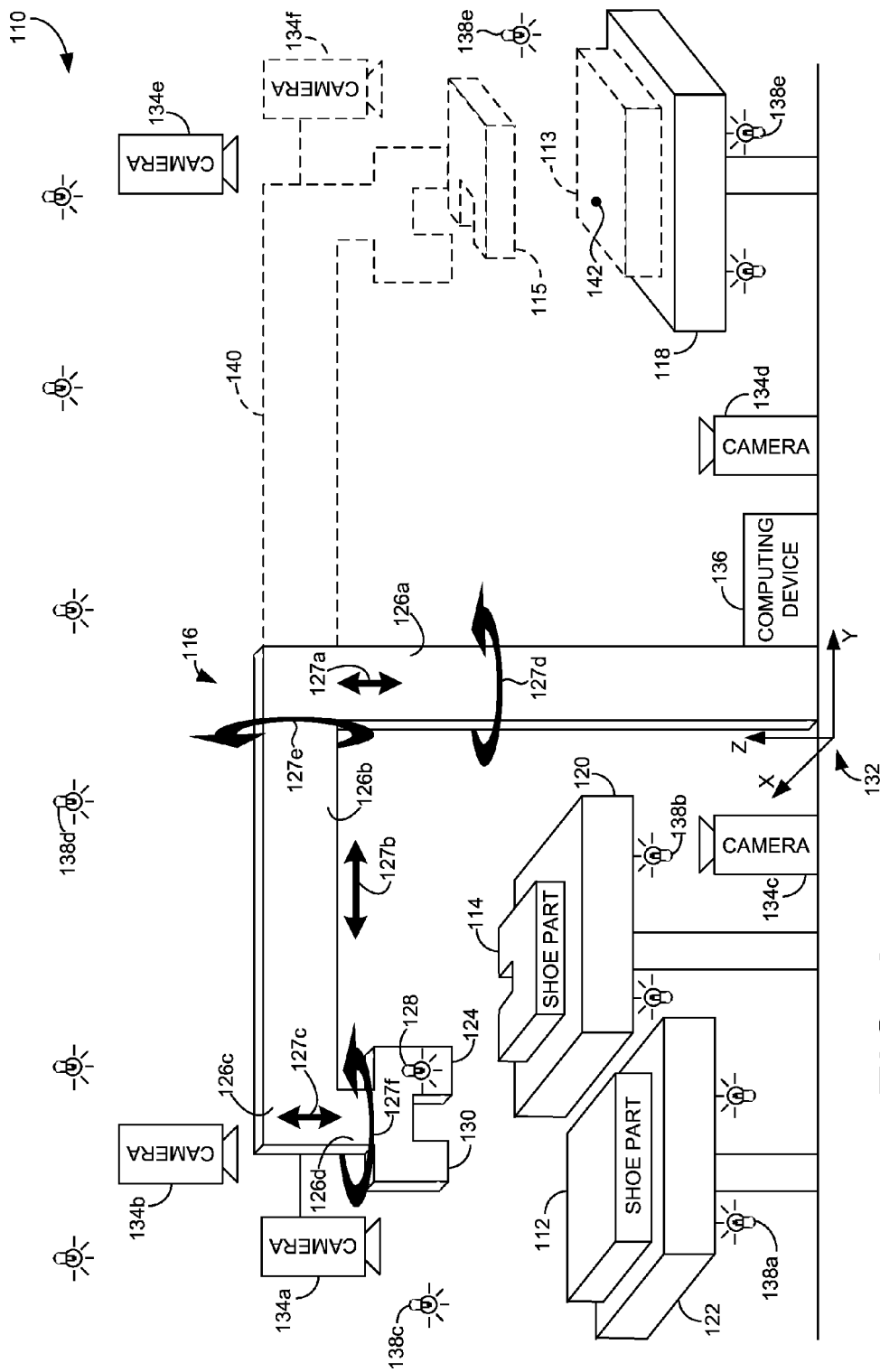

Referring now to FIG. 2, a depiction is provided of a system 110 in which various shoe-manufacturing processes may be performed. System 110 is comprised of various automated manufacturing apparatuses and tools, which may function to, among other things, position and assemble shoe parts. For example, shoe parts 112 and 114 may be transferred by shoe-manufacturing apparatus 116 and assembled. Whereas FIG. 1 depicts multiple shoe-manufacturing apparatuses 16*a-c*, FIG. 2 depicts a single shoe manufacturing apparatus 116. As such, system 110 of FIG. 2 may be a station within a larger system 10 of FIG. 1. For example, shoe-manufacturing apparatus 116 of FIG. 2 may perform functions of shoe manufacturing apparatus 16*a* depicted in FIG. 1.

Elements in FIG. 2 may be relatively generically represented so as to fit into the context of the schematic diagrams of FIG. 2 and into the description provided herein. For example, shoe parts 112 and 114 and apparatus 116 are relatively generic shapes, which are provided for exemplary and explanatory purposes. However, these elements may be comprised of various other shapes, sizes, configurations, etc. and still may be consistent with FIG. 2 and the description provided herein. For example, parts 112 and 114 may be similar to parts 12*a* and 14*a* depicted in FIG. 2.

Accordingly, shoe parts 112 and 114 may comprise the same or different types of flexible material, such as textile, leathers, TPU materials, etc. Shoe parts 112 and 114 may be physical structures of a completed shoe and/or components thereof, such as an adhesive (or other attachment means) that may be used to join shoe components during a shoe manufacturing process. In one exemplary aspect, shoe parts 112 and 114 represent different pieces of a shoe upper that are assembled prior to molding the shoe upper for attachment to other shoe parts.

FIG. 2 depicts that system 110 may be comprised of various manufacturing stations, such as a first manufacturing station 118, a second manufacturing station 120, and a third manufacturing station 122. A manufacturing station may serve various functions, such as storing shoe parts, making shoe parts available to be retrieved by other tools, and supporting shoe parts that are being assembled. For example, the second manufacturing station 120 and the third manufacturing station 122 may make shoe parts 114 and 112 available to be retrieved and transferred to the first manufacturing station 118. Moreover, the first manufacturing station 118 may function as an assembly station at which shoe parts 112 and 114 are assembled. While only one part is depicted at stations 120 and 122, each station may also support multiple parts at the same time. As such, stations 118, 120, and 122 of FIG. 2 may perform functions of support surface 18, feeding station 20*a* and feeding station 20*b/c* (respectively) of FIG. 1.

A manufacturing station may be comprised of various manufacturing support apparatuses. For example, a manufacturing station may comprise a fixed support surface, such as a table, bench, etc. In addition, a manufacturing station may comprise a movable support surface that transfers one or more shoe parts from one location to another location. A conveyor apparatus having a conveyor belt is an example of a movable support surface. For example, stations 120 and 122 may comprise conveyor apparatuses that move shoe parts 112 and 114 to a retrieval area, from which shoe parts 112 and 114 are acquired by shoe-manufacturing apparatus 116. Moreover, station 118 may comprise a conveyor apparatus that moves one or more shoe parts along an assembly line, thereby allowing the one or more shoe parts to undergo various shoe-manufacturing steps (e.g., assembly, molding, pressing, quality control, etc.).

System 110 may have other shoe-manufacturing apparatuses and tools, such as shoe-manufacturing apparatus 116, which may comprise tools 124, 126*a-d*, 128, and 130 that are described below. Shoe-manufacturing apparatus 116 may function in various capacities. For example, shoe-manufacturing apparatus 116 may pick up shoe parts 112 and 114 and transfer the shoe parts 112 and 114 to various positions. In one exemplary aspect, shoe parts 112 and 114 may be moved into a field of view of a camera (e.g., 134*c* or 134*d*). Moreover, shoe parts 112 and 114 may be transferred to another manufacturing station.

As such, shoe-manufacturing apparatus 116 may be comprised of multiple tools that are integrated into a single shoe-manufacturing apparatus. Each of the multiple tools that comprise shoe-manufacturing apparatus 116 may serve one or more respective functions, such that the multiple tools cooperatively operate to execute tasks of the shoe-manufacturing apparatus 116. In an exemplary aspect, shoe-manufacturing apparatus 116 comprises a pick-up tool 124, a part-transfer tool 126*a-d*, a light-emitting tool 128, and/or a part-attachment tool 130. As already indicated, the depictions of each of these tools 124, 126*a-d*, 128, and 130 may be generic, such that each tool may comprise alternative shapes, sizes, configurations, and components in accordance with more specific aspects of the present invention.

An exemplary part-pickup tool 124 may function to pick up one or more parts from a manufacturing station. Accordingly, a part-pickup tool 124 may pick up the one or more parts by manipulating or working on the parts in various manners, such as by grasping or gripping, scooping, adhering, and/or applying a suction force to the part. As such, a part-pickup tool 124 may comprise various components that function to carry out a desired manner of temporarily picking up a part, retaining a part while the part is being moved, and releasing the part when the part is positioned at a desired position. For example, a part-pickup tool 124 may comprise a robotic claw that functions to grip or grasp a shoe part. Alternatively, an exemplary part-pickup tool 124 may comprise a vacuum tool, which applies a suction force to the part that is sufficient to pick up the part. In another aspect, part-pickup tool 124 may comprise electromagnetic components and/or tacky/adhesive components.

In one aspect, the part-pickup tool 124 comprises a part-pickup tool described in U.S. patent application Ser. No. 13/299,934, which is titled MANUFACTURING VACUUM TOOL, and is incorporated in its entirety herein by reference. For example, the part-pickup tool 124 may comprise a plate having a plurality of apertures as depicted in FIGS. 1 and 5-15 of U.S. patent application Ser. No. 13/299,934. Furthermore, part-pickup tool 124 may function to pickup shoe parts having a variety of characteristics or combinations of characteristics, such as rigid, malleable, porous, non-porous, etc. Moreover, part-pickup tool 124 may be functional to pick up and position a part constructed, at least in part, of leather, polymers, textiles, rubber, foam, mesh, and/or the like. In a further aspect, a part is comprised of a pre-laminated composition (e.g., hot melt) that helps to facilitate adherence of the part to the part-pickup tool when the part pickup tool picks up, transfers, and places the part.

An exemplary part-transfer tool 126*a-d* may function to transfer and position various items throughout system 110. In an aspect of the invention, an exemplary part-transfer tool 126*a-d* may transfer and position other tools (e.g., part-pickup tool 124 and part-attachment tool 130) that may be integrated with part-transfer tool 126*a-d* into shoe-manufacturing apparatus 116. For example, part-transfer tool 126*a-d* may position part-pickup tool 124 in an orientation relative to stations 120 and 122 that enables part-pickup tool 124 to pick up a shoe part. In another example, part-transfer tool 126*a-d* may position part-attachment tool 130 in an orientation relative to station 118 that enables part-attachment tool to couple shoe parts positioned at station 118. In another aspect of the invention, a part-transfer tool 126*a-d* may transfer a shoe part that has been picked up by part-pickup to 124 to another position. For example, when part-pickup tool 124 picks up either part 112 or 114, part-transfer tool 126*a-d* may maneuver to enable part 112 or 114 to be positioned at station 118.

Arrows 127*a-f* are depicted in FIG. 2 to illustrate exemplary directions in which part-transfer tool 126*a-d* may move. As such, part-transfer tool 126*a-d* may move back and forth in a direction of arrows 127*a-c* and may move rotationally in a direction of arrows 127*d-f*. Arrows 127*a-f* are exemplary only. Accordingly, a part-transfer tool 126*a-d* may transfer a part in various manners, such as by employing a combination of telescoping members, hydraulic arms, and/or articulating joints. Moreover, part-transfer tool 140 is depicted in broken lines to illustrate another position to which part-transfer tool 126*a-d* may move, such as when the part-transfer tool moves a shoe part from station 120 or 122 to station 118.

An exemplary light-emitting tool 128, which is integrated with shoe-manufacturing apparatus 116, may function to illuminate at least a portion of a shoe part. For example. Light-emitting tool 128 may function as a front light that illuminates shoe parts 112 and 114 when each is positioned at a respective station. Moreover, light-emitting tool 128 may function as a back light that illuminates a shoe part acquired and held by part-pickup tool 124. Other descriptions of exemplary characteristics and purposes of a light-emitting tool or device are provided in U.S. patent application Ser. No. 13/299,856, which is titled AUTOMATED IDENTIFICATION OF SHOE PARTS, and is incorporated by reference herein in its entirety. For example, system 110 may also comprise light-emitting devices 138*a-f*, which are described in more detail below.

An exemplary part-attachment tool 130 may function to attach one or more shoe parts onto another shoe part. As such, a part-attachment tool 130 may comprise components that function to carry out a desired manner of attaching a part, such as by stitching, adhering, welding, heat pressing, and/or any other attachment method that is suitable to attach shoe parts. For example, a part-attachment tool 130 may comprise an automatic sewing tool that functions to make a stitch at a desired location on parts to be connected. Alternatively, an exemplary part-attachment tool 130 may comprise an ultrasonic-welding tool, which applies a frequency to the part that is sufficient to weld the part to another part. In another aspect, an exemplary part-attachment tool 130 may apply a heat weld or press.

In one aspect, the part-attachment tool 130 may comprise a part-attachment tool described in U.S. patent application Ser. No. 13/299,908, which is titled MULTI-FUNCTIONAL MANUFACTURING TOOL, and is incorporated in its entirety herein by reference. For example, the part-attachment tool 130 may comprise an ultrasonic welder that is identified by reference numeral 200 and is depicted in various figures of said U.S. patent application Ser. No. 13/299,908. Accordingly, the part-attachment tool 130 and the part-pickup tool 124 may be combined as an integrated functional unit.

System 110 may also be comprised of a part-recognition system, which analyzes an image or scan of a shoe part to determine various characteristics of the shoe part. For example, the part-recognition system may analyze an image to determine a part's size, shape, color, thickness, identity, compliance with quality-control measures, position, rotation, distance from other parts, etc. Moreover, the part-recognition system may be used to instruct other shoe-manufacturing devices (e.g., 116) regarding a manner in which a part should be manipulated in a manufacturing process, such as by attaching the part to another part, rotating, cutting, buffing, coloring, printing, spraying, customizing, molding, etc. In an exemplary aspect, the part-recognition system may be used to determine an identity of a shoe part (e.g., 112 and/or 114), which is positioned at a manufacturing station (e.g., 118, 120, and/or 122), and to determine an orientation (e.g., geometric position and amount of rotation) of the shoe part within a dimensional coordinate system (two-dimensional (2-D) coordinate system and/or three-dimensional (3-D) coordinate system), which is identified by axes 132.

As such, an exemplary part-recognition system may be comprised of one or more image recorders 134*a-f* (e.g., cameras) that may be positioned throughout system 110 and may communicate with a computing device 136. When executing functions of the part-recognition system, an image recorder may record an image of a shoe part that depicts a 2-D representation of the shoe part and that is analyzed to derive various information. Image recorders 134*a-f* are exemplary only, and the number, location, and/or orientation of image recorders 134*a-f* may vary beyond the example illustrated in FIG. 2.

Part-recognition system may further comprise light-emitting tool 128, which was described above as a tool integrated into manufacturing apparatus 116, as well as light-emitting devices 138*a-f*. Light-emitting devices 128 and 138*a-f* may be utilized to provide a certain lighting effect to a shoe part when an image is recorded. For example, a light-emitting device may provide a contrast between a shoe part and a surrounding environment (e.g., background), thereby making a boundary of a shoe part easier to detect in an image.

Light-emitting devices 138*a-f* represent lighting devices (e.g., incandescent bulbs, fluorescent devices, LEDs, or any other device capable of emitting light) that may be positioned at various locations throughout system 110. As such, light-emitting devices 138*a-f* may be positioned to provide various lighting effects to a shoe part. Exemplary lighting effects may be a front light or a back light. For example, when shoe part 112 is at station 122, lighting device 138*a* may provide a back-light effect when a camera 134*a* or 134*b* records an image of the shoe part 112. Moreover, light-emitting device 138*c* may provide a front light to part 112 at station 122. The light-emitting devices 138*a-f* depicted in FIG. 2 are exemplary only, and the number, type, and position of light-emitting devices 138*a-f* may vary.

In an exemplary aspect, an image recorded by part-recognition system is communicated to computing device 136. Computing device 136 may help execute various operations, such as by analyzing images and providing instructions to shoe-manufacturing equipment. Computing device 136 may be a single device or multiple devices, and may be physically integral with the rest of system 110 or may be physically distinct from other components of system. Computing device 136 may interact with one or more components of system 110 using any media and/or protocol. Computing device 136 may be located proximate to or distant from other components of system 110.

In an exemplary aspect, computing device 136 may help analyze images and derive information therefrom. For example, information that computing device 136 derives from an image may comprise an identity of a shoe part and an orientation of the shoe part with respect to a 2-D geometric system. An orientation may comprise a geometric coordinate (e.g., x value and y value) in the 2-D geometric coordinate system, as well as an amount to which a shoe part is rotated in the 2-D geometric coordinate system.

In a further aspect, computing device 136 may use the image-derived information to instruct shoe-manufacturing apparatus 116, such as by notifying shoe-manufacturing apparatus 116 of a part orientation relative to the 2-D coordinate system 132 and of a new part orientation to which the shoe part should be transferred. For example, in system 110, shoe-manufacturing apparatus 116 may attach part 115 to part 113, both parts being depicted in a broken-line view. That is, part 112 and part 113 may be the same part that is depicted at two different positions in system 110, and part 114 and part 115 may be the same part that is depicted at two different positions in system 110.

Accordingly, computing device 136 may first determine an identity of part 112/113 and an orientation of part 112/113 at station 118. Based on the identity of part 112/113 and the orientation of part 112/113 at station 118, computing device 136 may determine an orientation 142 in the 2-D geometric coordinate system to which part 114/115 may be transferred. Moreover, computing device 136 may determine an attachment point at which part 114/115 is to be attached to part 112/113 by part-attachment tool 130. In addition, FIG. 2 illustrates that a rotation of part 114 may be different than a rotation of part 115, thereby depicting that the third orientation may comprise an amount of rotation in addition to a geometric coordinate.

As such, in an aspect of the invention, the part-recognition system may comprise some or all of the 2-D part-recognition system described in U.S. patent application Ser. No. 13/299,856, which is titled AUTOMATED IDENTIFICATION OF SHOE PARTS, and is incorporated in its entirety herein by reference.

Figure 4:
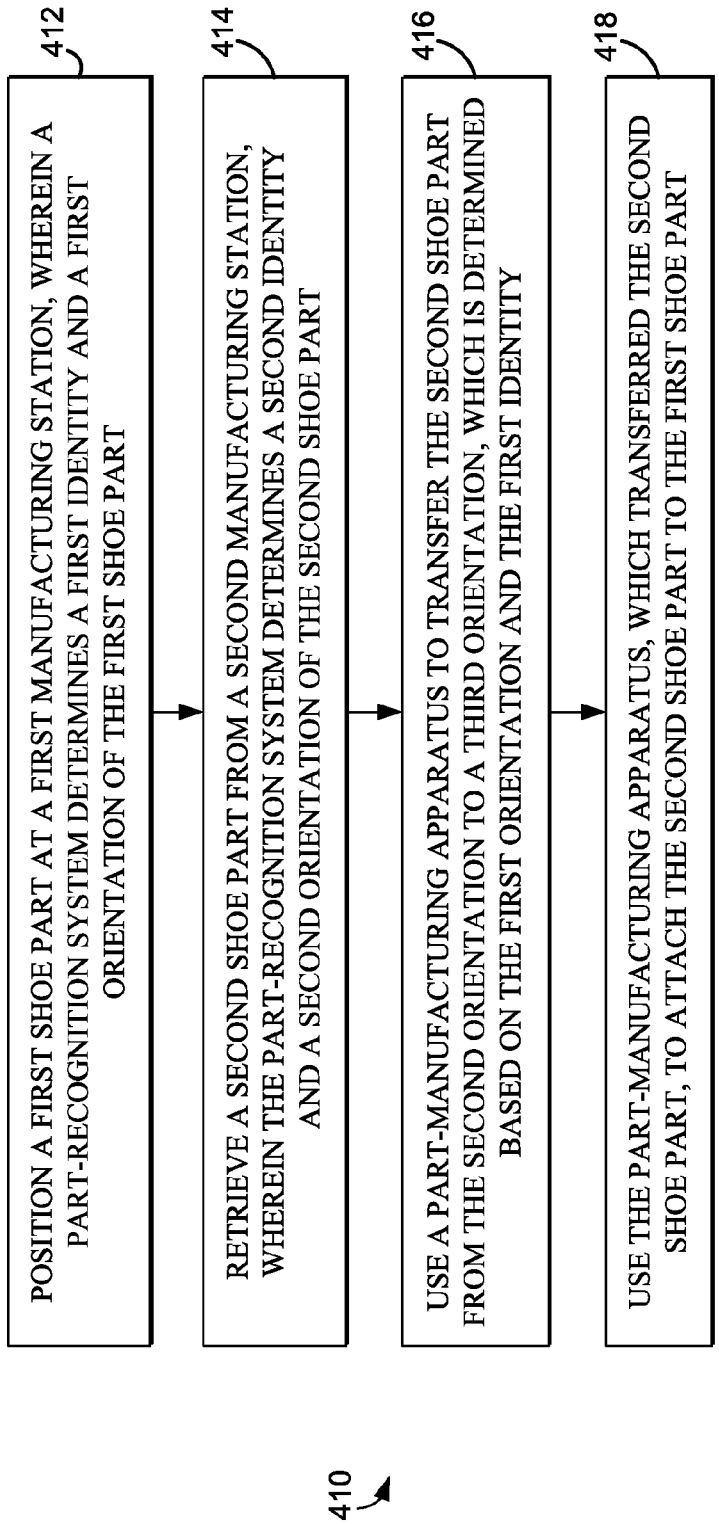
FIGS. 4 and 5 depict flow diagrams of respective methods of manufacturing shoe parts in an automated manner in accordance with the present invention.

Referring now to FIG. 4, a flow diagram depicts a method 410 of manufacturing a shoe part in an automated manner that may be carried out in system 110. In describing FIG. 4, reference is also be made to FIG. 2. In addition, method 410, or at least a portion thereof, may be carried out when a computing device (e.g., 136) executes a set of computer-executable instructions stored on computer storage media.

At step 412, method 410 may comprise positioning a first shoe part at a first manufacturing station, wherein a part-recognition system determines a first identity of the first shoe part and determines a first orientation of the first shoe part respective to a two-dimensional (2-D) geometric coordinate system. For example, shoe part 113 may be positioned at station 118, such as by a conveyor apparatus or by shoe-manufacturing apparatus 116. Part-recognition system may analyze an image of shoe part 113 to determine an identity of shoe part 113 and an orientation of shoe part 113 as positioned at station 118. As described above, the orientation of shoe part 113 may comprise a geometric coordinate and amount of rotation in 2-D geometric coordinate system 132. An image of shoe part 113 may be captured by any of cameras 134a-f, depending on where shoe part 113 is positioned when the image is captured.

Method 410 may also comprise at step 414, retrieving a second shoe part from a second manufacturing station, wherein the part-recognition system determines a second identity of the second shoe part and determines a second orientation of the second shoe part respective to the 2-D geometric coordinate system. For example, shoe part 114 may be retrieved by apparatus 116 either after an image of part 114 is recorded (e.g., by using camera 134a or 134b) or before an image of part 114 is recorded (e.g., by using camera 134c when apparatus 116 positions part 114 in a field of view of camera 134c). In either scenario, the image may be analyzed to determine a part identify of part 114 and a part orientation of part 114.

At step 416, the part-manufacturing apparatus may be used to transfer the second shoe part (e.g., part 114 that is also represented in broken lines as part 115) from the second orientation to a third orientation, which is determined based on the first orientation and the first identity. That is, as described above, once part 113 has been identified and located, part-recognition system may determine an orientation (e.g., 142) to which part 115 should be placed. Furthermore, at step 418, the part-manufacturing apparatus (e.g., 116), which transferred the second part, may be used to attach the second shoe part to the first shoe part.

Figure 3:
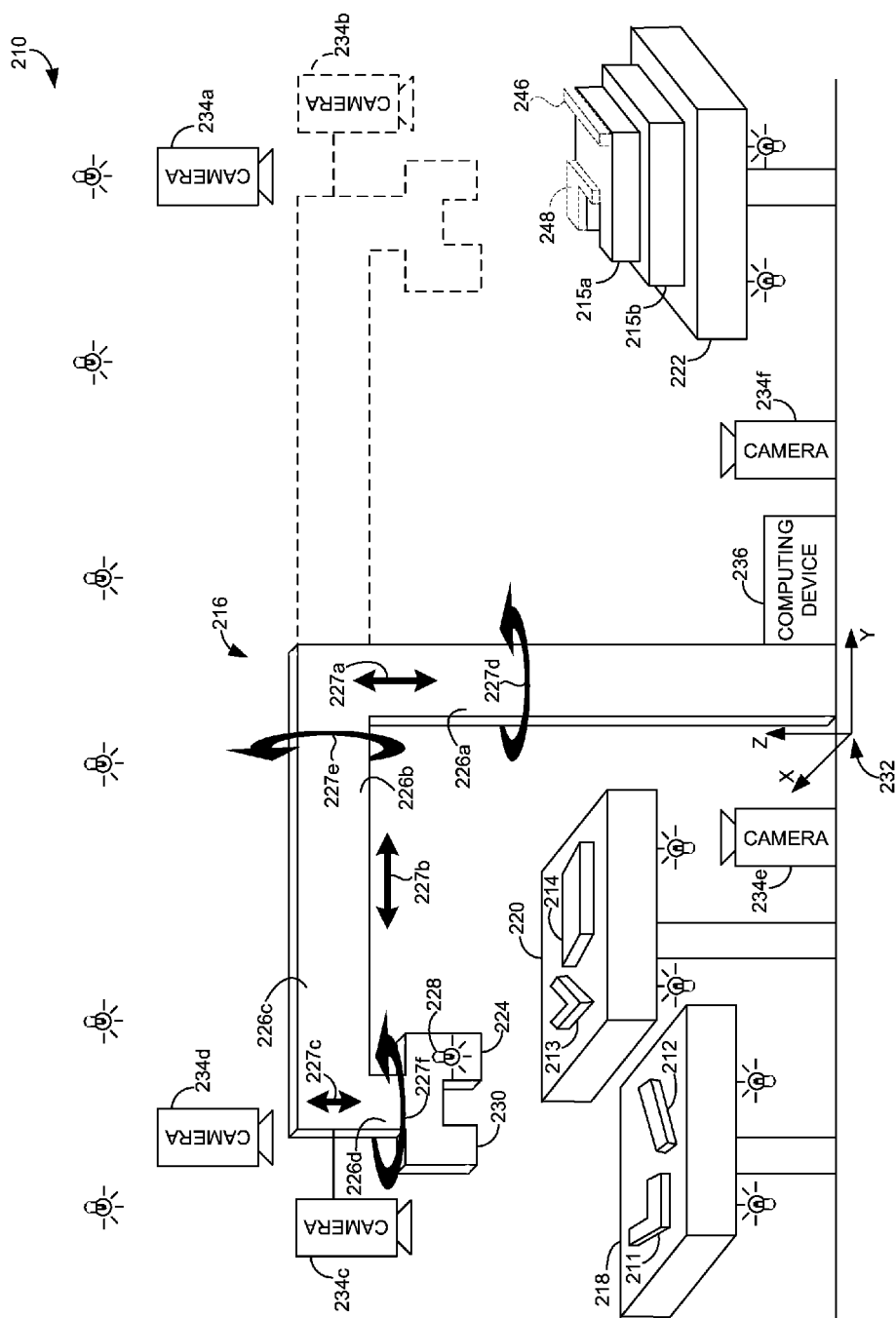

Referring to FIG. 3, another exemplary system 210 is depicted in which an automated shoe-manufacturing process may be carried out. System 210 is comprised of various automated manufacturing apparatuses and tools, which may function to, among other things, position and assemble shoe parts. For example, system 210 may function to transfer one or more shoe parts 211-214 from stations 218 and 220 to station 222. Moreover, system 210 may function to attach the one or more shoe parts 211-214 onto a shoe part 215a-b positioned at station 222. In these respects, shoe parts 211-214 may be similar to shoe parts 14b-f of FIG. 1. Moreover, stations 218 and 220 may be similar to stations 20d-f of FIG. 1, and station 222 may be similar to surface 18a.

Accordingly, whereas FIG. 1 depicts multiple shoe-manufacturing apparatuses 16a-c, FIG. 3 depicts a single shoe manufacturing apparatus 216. As such, system 210 of FIG. 3 may be a station within a larger system 10 of FIG. 1. For example, shoe-manufacturing apparatus 216 of FIG. 3 may perform functions of shoe manufacturing apparatus 16b depicted in FIG. 1. Moreover, system 210 may be comprised of some components that function similarly to system 110, such as various shoe-manufacturing stations, light-emitting devices, image recorders, and a shoe-manufacturing apparatus.

While system 110 and 210 may share similar components, components of system 210 may operate differently than elements described in system 110. For example, systems 110 and 210 may be arranged at different positions within system 10 (FIG. 1) and may be configured to assemble different shoe parts.

In FIG. 3, system 210 may comprise a shoe-manufacturing apparatus 216, which is similar to apparatus 116 depicted in FIG. 2. For example, shoe-manufacturing apparatus 216 may be comprised of a part-pickup tool 224, a part-transfer tool 226a-d, a light-emitting device 228, and a part-attachment tool 230, which execute respective functions in a cooperative manner to carry out tasks of apparatus 216. In addition, arrows 227a-f depict directions in which apparatus 216 may adjust and move to transfer tools or parts to various positions within system 210.

However, because shoe parts 211-214 may need to be processed differently than shoe parts 112 and 114 (of FIG. 2), tools associated with shoe-manufacturing apparatus 216 may function in a different manner than in apparatus 116. For example, shoe parts 211-214 may have different characteristics than shoe parts 112 and 114, such that system 210 comprises operations, functions, and components that are different than system 110. For example, shoe part 212 may be comprised of a different size, configuration, construction, purpose, etc. relative to shoe parts 112 or 114. As such, system 210 may pick up, transfer, attach, and execute manufacturing processes related to part 212 in a manner that is different than in system 110.

In an exemplary aspect, shoe parts 211-214 may be comprised of smaller dimensions than parts in system 110. As such, part-pickup tool 224 may comprise a single-aperture or dual-aperture vacuum tool, such as the exemplary tool depicted in FIG. 22 of previously mentioned U.S. patent application Ser. No. 13/299,934, which is titled MANUFACTURING VACUUM TOOL, and is incorporated in its entirety herein by reference. In another exemplary aspect, part-pickup tool 224 may comprise both a single- or dual-aperture vacuum tool, as well as a plate having a plurality of apertures. Such an exemplary hybrid part-pickup tool may function to pickup up parts having a range of sizes that is wider than a single- or dual-aperture tool or plate-style tool alone. In another aspect, part-pickup tool 224 and part-attachment tool 230 may be integrated into a single head.

In a further aspect of the invention, some or all of shoe parts 211-214 may be positioned at stations 218 and 220 in a manner that matches a configuration of the parts 211-214 when the parts are attached to a base part (e.g., 215a). As such, a pickup tool 224 may simultaneously pick up multiple parts in a manner that holds the parts in the configuration; transfers the parts while maintaining the configuration; and then places the parts on the base part while maintaining the configuration. For example, a plate-style pickup tool having multiple apertures may be used to pick up more than once part at a time, while maintaining the parts in a configuration. In another aspect, multiple single- or dual-aperture pickup tools may be used to pick up more than one part at a time.

Various techniques may be applied to arrange some or all of shoe parts 211-214 at stations 218 and 220 to match a configuration of the part when attached to a base. For example, shoe parts 211-214 may be cut using an automatic cutting tool that is programmed to cut the shoe parts in a pre-determined configuration. An exemplary automatic cutting tool may comprise a plurality of part-shaped dies that are arranged on the automatic cutting tool to match the pre-determined configuration, such that when the part-shaped dies are pressed into a stock material, the cut parts are arranged to match the pre-determined configuration. In another aspect, another part-manufacturing apparatus (e.g., similar to 216) may be used to place parts 211-214 at stations 218 and 220 in a pre-determined configuration.

In another aspect of the present invention, some or all of shoe parts 211-214 are moved from stations 218 and 220 and are attached to an assembly of parts 215a-b. As such, a part-recognition system of system 210 may execute a part-selection protocol, which determines an order in which the apparatus 216 is instructed to sequentially transfer shoe parts. For example, a protocol may determine that parts 211-214 are transferred and attached in a pre-determined order. Alternatively, a protocol may determine that parts 211-214 may be transferred and attached in any order. In another aspect, a protocol may determine that an order in which parts 211-214 may be transferred is dictated by a position of each part among stations 218 and 220. For example, a protocol may instruct apparatus 216 to transfer parts in an order that enables a most efficient movement path (e.g., least distance and least rotation) from stations 218 or 220 to station 222.

Figure 5:
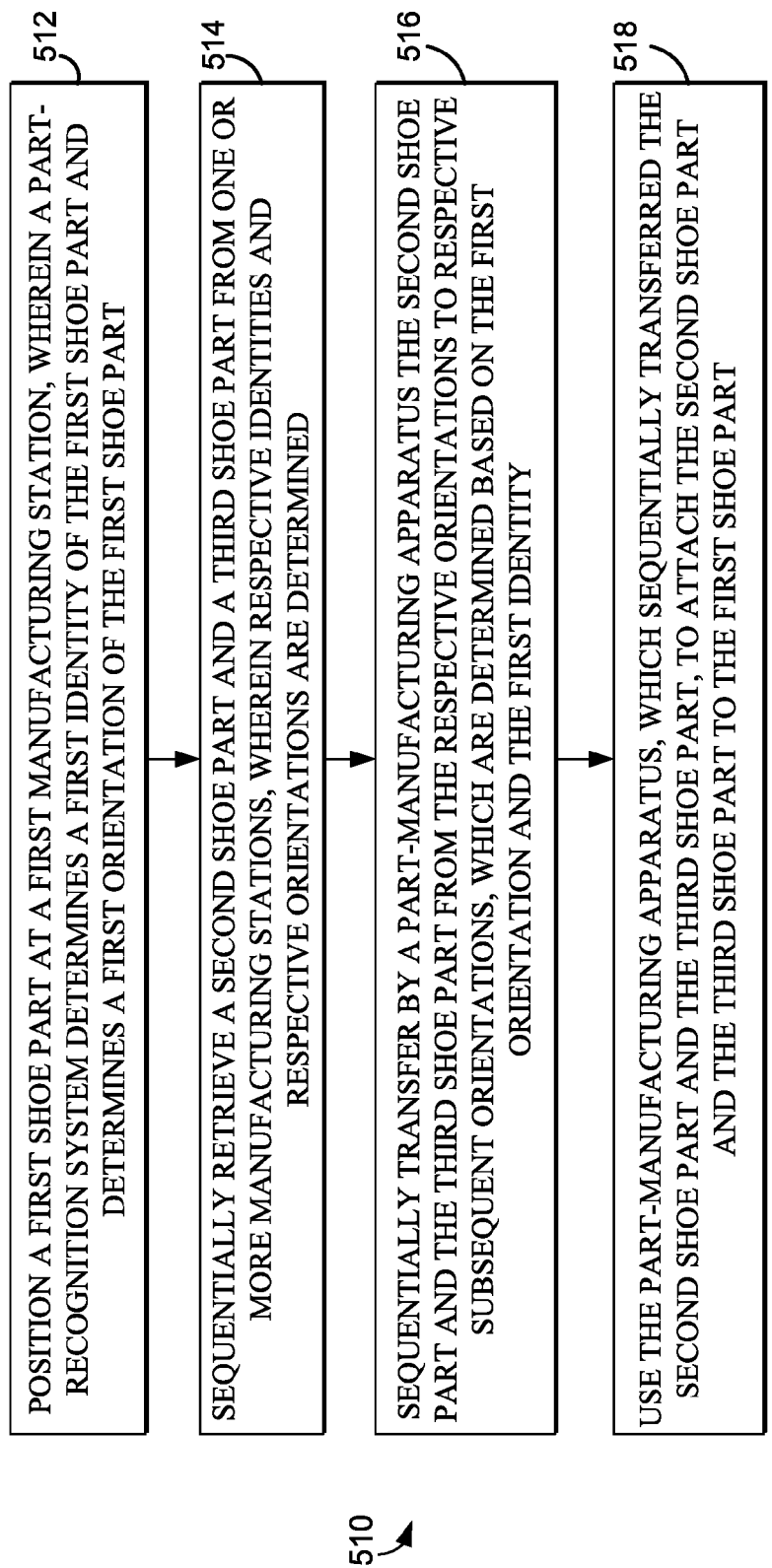

Referring now to FIG. 5, a flow diagram depicts a method 510 of manufacturing a shoe part in an automated manner that may be carried out in system 210. In describing FIG. 5, reference is also be made to FIG. 3. In addition, method 510, or at least a portion thereof, may be carried out when a computing device 236 executes a set of computer-executable instructions stored on computer storage media.

A block 512 depicts a step of positioning a first shoe part at a first manufacturing station, wherein a part-recognition system determines a first identity of the first shoe part and determines a first orientation of the first shoe part within a two-dimensional (2-D) geometric coordinate system. For example, shoe parts 215a and 215b may comprise a first shoe part positioned at manufacturing station 222. That is, a shoe part may also be comprised of an assembly of shoe parts. Accordingly, image recorder 234a and/or 234b may record an image of the assembly of parts 215a and 215b that is analyzed to determine an identity of the assembly and an orientation of the assembly relative to 2-D geometric coordinate system 232. As such, part-recognition system may treat the assembly of parts 215a and 215b as a single part for identification purposes and when determining an orientation.

Block 514 depicts a step of sequentially retrieving a second shoe part and a third shoe part from one or more manufacturing stations, wherein the part-recognition system determines respective identities of the second shoe part and the third shoe part and determines respective orientations, which are within the 2-D geometric coordinate system, of the second shoe part and the third shoe part. For example, shoe part 212 may be retrieved by apparatus 216, wherein an image of shoe part 212 captured by camera 234c or 234d before the retrieval or by camera 234e or 234f after the retrieval. The image of shoe part 212 may be analyzed by part-recognition system to determine a respective identity and respective orientation of shoe part 212. Subsequently, shoe part 211 may be retrieved, and an image of part 211 may be analyzed to determine a respective identity and respective orientation of shoe part 211.

A block 516 depicts using a part-manufacturing apparatus to sequentially transfer the second shoe part and the third shoe part from the respective orientations to respective subsequent orientations, both of which are determined based on the first orientation and the first identity. Continuing with the above example, if part 212 is retrieved first, apparatus 216, and more specifically tool 226a-d, may be used to transfer part 212 from the respective orientation of part 212 when the image was recorded to a subsequent orientation, which is illustrated by a broken-line view 246 of part 212. The subsequent orientation depicted by 246 may be determined based on an orientation of the assembly of parts 215a and 215b. Moreover, if part 211 is retrieved second, apparatus 216 may then transfer part 211 from the respective orientation of part 211 to a subsequent orientation, which is illustrated by a broken-line view 248 of part 212. The subsequent orientation depicted by 248 may be determined based on an orientation of the assembly of parts 215a and 215b.

A block 518 depicts using the part-manufacturing apparatus, which sequentially transferred the second shoe part and the third shoe part, to attach the second shoe part and the third shoe part to the first shoe part. For example, part-attachment tool 230 of apparatus 216, which may also transfer parts 211 and 212 using tools 224 and 226*a-d*, may attach parts 212 and 211 at orientations 246 and 248 (respectively) to the assembly of parts 215*a* and 215*b*. That is, pickup tool 224 may release part 212 (such as by removing a suction force), which is attached using part-attachment tool 230 to part 215*a* at orientation 246. Then, part 211 may be retrieved, transferred, and released by pickup tool 224 at orientation 248, at which point part 211 is attached by part-attachment tool 230.

Although method 510 is described as a series of sequential steps, the second shoe part and the third shoe part may be retrieved simultaneously from one or more manufacturing stations. In this aspect, the part-recognition system determines respective identities and orientations of the second shoe part and third shoe part. The part-manufacturing apparatus may then simultaneously transfer the second shoe part and the third shoe part from the respective orientations to respective subsequent orientations, both of which are determined based on the first orientation and the first identity. The second shoe part and the third shoe part may then be either sequentially or simultaneously attached to the first shoe part.

Accordingly, systems 110 and 210 have been described that may comprise at least a portion of system 10. The components of systems 110 and 210 are interchangeable and combinable in various manners to enable manufacturing of shoes and shoe parts having a wide range of characteristics. For example, shoe-manufacturing apparatus 16*c* may comprise various combinations of parts described with respect to apparatus 16*a* and 16*b*. Alternatively, shoe-manufacturing apparatus 16*c* may be comprised of different tools.

In an exemplary aspect, a part-pickup tool 24*c* (or a part pickup tool in "N Stations" 5) may be comprised of a medium pickup tool that is designed to pickup medium-sized shoe parts. A medium pickup tool may be configured in various manners to achieve desired functionality. In an exemplary aspect, a medium pickup tool is comprised of a plate that is similar to the plate described with respect to pickup tool 24*a*. However, if pickup tool 24*a* is designed to pick up larger shoe parts than pickup tool 24*c*, the plate of pickup tool 24*c* may be smaller than the plate of pickup tool 24*a*. An example of a smaller plate is depicted by FIGS. 19-21 of previously identified U.S. application Ser. No. 13/299,934.

In another exemplary aspect a part-pickup tool 24*c* (or a part-pickup tool in "N Stations" 5) may be comprised of a combination of pickup tools, such that the pickup tool may be able to pick up shoe parts that range in size. For example, a part-pickup tool may be comprised of a combination of both a single- or dual-aperture pickup tool (as described with respect to pickup tool 24*b*) and a pickup tool having a plate with multiple apertures. As such, a combination pickup tool (i.e., hybrid pickup tool) may be able to pick up both small shoe parts and medium/large shoe parts.

Figure 6:
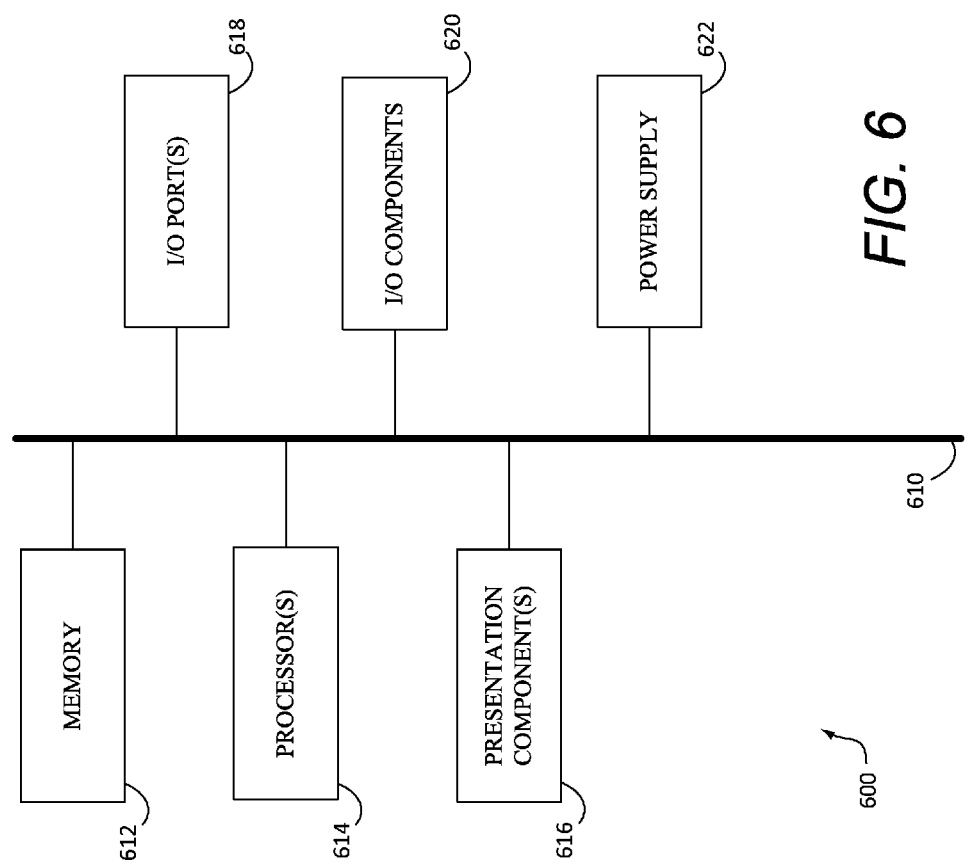
FIG. 6 depicts a block diagram of an exemplary computing device that may be used with systems and methods in accordance with the present invention.

As described above, our technology may comprise, among other things, a method, a system, or a set of instructions stored on one or more computer-readable media. Information stored on the computer-readable media may be used to direct operations of a computing device, and an exemplary computing device 600 is depicted in FIG. 6. Computing device 600 is but one example of a suitable computing system and is not intended to suggest any limitation as to the scope of use or functionality of invention aspects. Neither should the computing system 600 be interpreted as having any dependency or requirement relating to any one or combination of components illustrated. Moreover, aspects of the invention may also be practiced in distributed computing systems where tasks are performed by separate or remote-processing devices that are linked through a communications network.

Computing device 600 has a bus 610 that directly or indirectly couples the following components: memory 612, one or more processors 614, one or more presentation components 616, input/output ports 618, input/output components 620, and an illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, processors may have memory.

Computing device 600 typically may have a variety of computer-readable media. By way of example, and not limitation, computer-readable media may comprises Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 600.

Memory 612 is comprised of tangible computer-storage media in the form of volatile and/or nonvolatile memory. Memory 612 may be removable, nonremovable, or a combination thereof. Exemplary hardware devices are solid-state memory, hard drives, optical-disc drives, etc.

Computing device 600 is depicted to have one or more processors 614 that read data from various entities such as memory 612 or I/O components 620. Exemplary data that is read by a processor may be comprised of computer code or machine-useable instructions, which may be computer-executable instructions such as program modules, being executed by a computer or other machine. Generally, program modules such as routines, programs, objects, components, data structures, etc., refer to code that perform particular tasks or implement particular abstract data types.

Presentation component(s) 616 present data indications to a user or other device. Exemplary presentation components are a display device, speaker, printing component, light-emitting component, etc. I/O ports 618 allow computing device 600 to be logically coupled to other devices including I/O components 620, some of which may be built in.

In the context of shoe manufacturing, a computing device 600 may be used to determine operations of various shoe-manufacturing tools. For example, a computing device may be used to control a part-pickup tool or a conveyor that transfers shoe parts from one location to another. In addition, a computing device may be used to control a part-attachment tool 130 that attaches (e.g., welds, adheres, stitches, etc.) one shoe part to another shoe part.

Many different arrangements of the various components depicted, as well as components not shown, are possible without departing from the scope of the claims below. Exemplary aspects of our technology have been described with the intent to be illustrative rather than restrictive. Alternative aspects will become apparent readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A system for manipulating shoe parts in an automated manner during a shoe manufacturing process, the system comprising:
   a computing device;
   a part-recognition system in communication with the computing device, the part-recognition system configured to:
      determine a first identity and a first orientation of a first shoe part at a first manufacturing station, and
      determine a second identity and a second orientation of a second shoe part at a second manufacturing station; and
   a pick-up tool in communication with the computing device and configured to:
      retrieve the first shoe part from the first manufacturing station; and
      transfer the first shoe part onto the second shoe part at the second manufacturing station,
      wherein transferring the first shoe part onto the second shoe part comprises transferring the first shoe part from the first orientation to a third orientation and placing the first shoe part in contact with the second shoe part for attachment, the third orientation determined based at least on the second orientation and the second identity of the second shoe part.

2. The system of claim 1, wherein the pick-up tool is a single-aperture vacuum tool.

3. The system of claim 1, wherein the pick-up tool is a multi-aperture vacuum tool.

4. The system of claim 1, further comprising a part-attachment tool directed by the computing device and adapted to attach the first shoe part to the second shoe part.

5. The system of claim 4, wherein at least one attachment point at which the part-attachment tool attaches the first shoe part to the second shoe part is determined based on the first identity, the second identity, the second orientation, and the third orientation.

6. The system of claim 4, wherein the pick-up tool and the part-attachment tool are integrated as a combined tool.

7. The system of claim 1, wherein a first image is analyzed by the part-recognition system to determine the first identity, and wherein the first image is recorded prior to the pick-up tool retrieving the first shoe part.

8. The system of claim 7, wherein a second image is analyzed by the part-recognition system to determine the second identity, and wherein the second image is recorded subsequent to the pick-up tool retrieving the first shoe part.

9. The system of claim 1, wherein the first orientation is respective to a two-dimensional geometric coordinate system and is determined by analyzing an image depicting a two-dimensional representation of the first shoe part.

10. The system of claim 1, wherein each of the first orientation, the second orientation, and the third orientation comprises a respective coordinate point in a 2-D geometric coordinate system and a respective amount of part rotation.

11. A system for manipulating shoe parts in an automated manner during a shoe manufacturing process, the system comprising:
   a computing device;
   a part-recognition system in communication with the computing device, the part-recognition system configured to:
      determine a first orientation of a plurality of shoe parts in a pre-determined configuration at a first manufacturing station,
      determine part identities and part orientations for each of the plurality of shoe parts in the pre-determined configuration, and
      determine a base identity and a second orientation of a base shoe part at a second manufacturing station; and
   a pick-up tool in communication with the computing device and configured to:
      retrieve the plurality of shoe parts in the pre-determined configuration from the first manufacturing station; and
      transfer the plurality of shoe parts onto the base shoe part at the second manufacturing station by transferring the plurality of shoe parts from the first orientation to a third orientation relative to the base shoe part while maintaining the pre-determined configuration of the plurality of shoe parts, such that the plurality of shoe parts contact the base shoe part for attachment,
      wherein the third orientation is determined based at least on the second orientation and the base identity of the base shoe part.

12. The system of claim 11, wherein, prior to being transferred, the plurality of shoe parts are cut by an automatic cutting tool in the predetermined configuration from a stock material.

13. The system of claim 12, wherein the automatic cutting tool comprises a plurality of part-shaped dies that are arranged on the automatic cutting tool to match the pre-determined configuration.

14. The system of claim 11, wherein the pick-up tool is a plate-style vacuum tool having a plurality of apertures, wherein the plate-style vacuum tool is further configured to retain at least one of the plurality of shoe parts after placing the remainder of the plurality of shoe parts onto the base shoe part.

15. A system for manipulating shoe parts in an automated manner during a shoe manufacturing process, the system comprising:
   a computing device;
   a part-recognition system in communication with the computing device and configured to:
      determine a first orientation of a plurality of shoe parts in a pre-determined configuration at a first manufacturing station,
      determine part identities and part orientations for each of the plurality of shoe parts in the pre-determined configuration, and
      determine a second orientation of a base shoe part at a second manufacturing station;
   a pick-up tool in communication with the computing device and configured to:
      retrieve the base shoe part in the second orientation from the second manufacturing station; and
      transfer the base shoe part to a third orientation at a third manufacturing station; and
   a plate-style vacuum tool having a plurality of apertures and directed by the computing device, wherein the plate-style vacuum tool is configured to:
      retrieve the plurality of shoe parts in the pre-determined configuration from the first manufacturing station; and
      transfer the plurality of shoe parts onto the base shoe part at the third manufacturing station by transferring the plurality of shoe parts to a fourth orientation relative to the base shoe part such that the plurality of shoe parts are placed in contact with the base shoe part for attachment.

16. The system of claim 15, wherein the part-recognition system determines an identity of the base shoe part.

17. The system of claim 15, wherein each of the first orientation, the second orientation, the third orientation, and the fourth orientation comprises a respective coordinate point in a 2-D geometric coordinate system and a respective amount of part rotation.

18. The system of claim 15, wherein the plate-style vacuum tool transfers the plurality of shoe parts onto the base shoe part by transferring the plurality of shoe parts from the first orientation to the fourth orientation while maintaining the pre-determined configuration of the plurality of shoe parts, and wherein the fourth orientation is determined based on the third orientation and the identity of the base shoe part.

19. The system of claim 15, further comprising a part-attachment tool directed by the computing device and adapted to attach at least one of the plurality of shoe parts to the base shoe part.

20. The system of claim 15, further comprising an automatic cutting tool directed by the computing device and adapted to cut the plurality of shoe parts in the predetermined configuration from a stock material.

* * * * *